US011927087B2

(12) United States Patent
Bodishbaugh et al.

(10) Patent No.: US 11,927,087 B2
(45) Date of Patent: Mar. 12, 2024

(54) ARTIFICIAL INTELLIGENCE BASED HYDRAULIC FRACTURING SYSTEM MONITORING AND CONTROL

(71) Applicant: Typhon Technology Solutions (U.S.), LLC, The Woodlands, TX (US)

(72) Inventors: Adrian Benjamin Bodishbaugh, The Woodlands, TX (US); Carrie Murtland, The Woodlands, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 824 days.

(21) Appl. No.: 16/938,759

(22) Filed: Jul. 24, 2020

(65) Prior Publication Data
US 2021/0025383 A1    Jan. 28, 2021

Related U.S. Application Data

(60) Provisional application No. 62/879,239, filed on Jul. 26, 2019.

(51) Int. Cl.
*E21B 43/26* (2006.01)
*F04B 49/06* (2006.01)
(Continued)

(52) U.S. Cl.
CPC ........ *E21B 43/2607* (2020.05); *F04B 49/065* (2013.01); *G06N 5/04* (2013.01);
(Continued)

(58) Field of Classification Search
CPC .... E21B 2200/22; E21B 43/2607; E21B 4/00; E21B 27/00; E21B 11/00; F04B 15/02;
(Continued)

(56) References Cited

U.S. PATENT DOCUMENTS 6,007,227 A  12/1999  Carlson
6,167,965 B1  1/2001  Bearden et al.
(Continued)

FOREIGN PATENT DOCUMENTS

AR  087298 A1  3/2014
AR  092923 A1  5/2015
(Continued)

OTHER PUBLICATIONS

Espacenet English Abstract for MX362628B, publication date of Jan. 29, 1 page.
(Continued)

*Primary Examiner* — Kidest Bahta
(74) *Attorney, Agent, or Firm* — Fenwick & West LLP

(57) ABSTRACT

A system monitors operation of a component in a hydraulic fracturing fleet. A sensor exposed to an external environment of the component is configured to detect external indicia of the operation of the component. Memory stores an artificial intelligence (AI) model, the AI model being trained to monitor the operation of the component in the system. One or more processors are operatively coupled to the memory and the sensor. The one or more processors are configured to obtain data of the external indicia detected with the sensor; input the obtained data into the AI model; detect, with the AI model and based on the input data of the external indicia, one of a plurality of predetermined states corresponding to the operation of the component; and perform a predetermined function based on the detected one of the plurality of predetermined states.

20 Claims, 12 Drawing Sheets

(51) Int. Cl.
*G06N 5/04* (2023.01)
*G06N 20/00* (2019.01)

(52) U.S. Cl.
CPC .......... *G06N 20/00* (2019.01); *E21B 2200/22* (2020.05); *F04B 2201/0208* (2013.01)

(58) Field of Classification Search
CPC .. F04B 2201/0208; F04B 23/06; F04B 47/02; F04B 49/007; F04B 49/065; F04B 3/00; F04B 2201/00; F04B 2205/00; G06N 20/00; G06N 5/04; G06N 3/004; G06N 3/02; G06N 3/12; G06N 3/00
See application file for complete search history.

(56) References Cited

U.S. PATENT DOCUMENTS

| | | | |
|---|---|---|---|
| 6,765,304 | B2 | 7/2004 | Baten et al. |
| 8,083,504 | B2 | 12/2011 | Williams et al. |
| 8,789,601 | B2 | 7/2014 | Broussard et al. |
| 9,121,257 | B2 | 9/2015 | Coli et al. |
| 9,140,110 | B2 | 9/2015 | Coli et al. |
| 9,366,114 | B2 | 6/2016 | Coli |
| 9,395,049 | B2 | 7/2016 | Vicknair et al. |
| 9,475,020 | B2 | 10/2016 | Coli et al. |
| 9,475,021 | B2 | 10/2016 | Coli et al. |
| 9,534,473 | B2 | 1/2017 | Morris et al. |
| 9,945,365 | B2 | 4/2018 | Hernandez et al. |
| 10,107,084 | B2 | 10/2018 | Coli et al. |
| 10,107,085 | B2 | 10/2018 | Coli et al. |
| 10,221,668 | B2 | 3/2019 | Coli et al. |
| 10,227,855 | B2 | 3/2019 | Coli et al. |
| 10,502,042 | B2 | 12/2019 | Coli et al. |
| 10,648,312 | B2 | 5/2020 | Coli et al. |
| 10,689,961 | B2 | 6/2020 | Coli et al. |
| 10,718,194 | B2 | 7/2020 | Coli et al. |
| 10,724,353 | B2 | 7/2020 | Coli et al. |
| 10,774,630 | B2 | 9/2020 | Coli et al. |
| 10,837,270 | B2 | 11/2020 | Coli et al. |
| 10,851,634 | B2 | 12/2020 | Coli et al. |
| 10,876,386 | B2 | 12/2020 | Coli et al. |
| 10,895,138 | B2 | 1/2021 | Coli et al. |
| 2009/0092510 | A1 | 4/2009 | Williams et al. |
| 2010/0101785 | A1* | 4/2010 | Khvoshchev ........... E21B 43/25 166/250.01 |
| 2014/0096974 | A1 | 4/2014 | Coli et al. |
| 2015/0068724 | A1 | 3/2015 | Coli et al. |
| 2015/0275891 | A1 | 10/2015 | Chong |
| 2015/0300145 | A1 | 10/2015 | Coli et al. |
| 2015/0314255 | A1 | 11/2015 | Coli et al. |
| 2016/0032703 | A1* | 2/2016 | Broussard ........... E21B 43/2607 166/250.01 |
| 2016/0177675 | A1 | 6/2016 | Morris et al. |
| 2016/0208593 | A1 | 7/2016 | Coli et al. |
| 2016/0208594 | A1 | 7/2016 | Coli et al. |
| 2016/0326855 | A1 | 11/2016 | Coli et al. |
| 2016/0369609 | A1 | 12/2016 | Morris et al. |
| 2017/0016433 | A1 | 1/2017 | Chong et al. |
| 2017/0036178 | A1 | 2/2017 | Coli et al. |
| 2017/0037718 | A1 | 2/2017 | Coli et al. |
| 2017/0104389 | A1 | 4/2017 | Morris et al. |
| 2017/0259227 | A1 | 9/2017 | Morris et al. |
| 2017/0322086 | A1 | 11/2017 | Luharuka et al. |
| 2018/0299878 | A1 | 10/2018 | Cella et al. |
| 2018/0363434 | A1 | 12/2018 | Coli et al. |
| 2018/0363435 | A1 | 12/2018 | Coli et al. |
| 2018/0363436 | A1 | 12/2018 | Coli et al. |
| 2018/0363437 | A1 | 12/2018 | Coli et al. |
| 2018/0363438 | A1 | 12/2018 | Coli et al. |
| 2019/0055827 | A1 | 2/2019 | Coli et al. |
| 2019/0112908 | A1 | 4/2019 | Coli et al. |
| 2019/0120024 | A1 | 4/2019 | Oehring et al. |
| 2019/0271218 | A1 | 9/2019 | Coli et al. |
| 2019/0277125 | A1 | 9/2019 | Coli et al. |
| 2019/0277126 | A1 | 9/2019 | Coli et al. |
| 2019/0277127 | A1 | 9/2019 | Coli et al. |
| 2019/0277128 | A1 | 9/2019 | Coli et al. |
| 2020/0318467 | A1 | 10/2020 | Coli et al. |
| 2020/0347710 | A1 | 11/2020 | Coli et al. |
| 2020/0347711 | A1 | 11/2020 | Coli et al. |

FOREIGN PATENT DOCUMENTS

| | | |
|---|---|---|
| AR | 104823 A2 | 8/2017 |
| AR | 104824 A2 | 8/2017 |
| AR | 104825 A2 | 8/2017 |
| AR | 104826 A2 | 8/2017 |
| CA | 2773843 A1 | 10/2012 |
| CA | 2835904 A1 | 10/2012 |
| CA | 2955706 A1 | 10/2012 |
| CA | 2845347 | 6/2017 |
| CA | 2900387 | 9/2018 |
| EP | 2904200 A1 | 8/2015 |
| EP | 2726705 B1 | 8/2018 |
| EP | 3444430 A1 | 2/2019 |
| EP | 3444431 A1 | 2/2019 |
| EP | 3444432 A1 | 2/2019 |
| EP | 3447239 A1 | 2/2019 |
| EP | 3453827 A2 | 3/2019 |
| EP | 3456915 A1 | 3/2019 |
| MX | 358054 B | 8/2018 |
| MX | 362628 B | 1/2019 |
| MX | 365888 | 6/2019 |
| MX | 365889 B | 6/2019 |
| MX | 366049 B | 6/2019 |
| WO | 2014053056 A1 | 4/2014 |

OTHER PUBLICATIONS

Espacenet English Abstract for MX365888, Publication Date of Jun. 19, 2019, 1 page.
Espacenet English abstract for MX365889B, publication date of Jun. 19, 2019, 1 page.
Espacenet English abstract of MX366049B, publication date of Jun. 26, 2019, 1 page.
Google Patent english Abstract for MX358054, publication date of Aug. 3, 2018, 1 page.
Gardner Denver, Inc., GD-2500 Quintuplex Well Service Pump, 2003, 2 pages, USA.
Gardner Denver, Inc., "Well Servicing Pump, Model GD-25000 Quintuplex", Power End Parts List, 300FWF997 Rev G, Apr. 2007, 15 pages, Tulsa, OK USA.
Gardner Denver Inc., "Well Servicing Pump, Model GD-25000, GD0-25000-HD, Quintuplex Pumps", GWS Fluid End Parts List, 302FWF997 Rev H, Jul. 2008, 39 pages, Tulsa, OK USA.
Gardner Denver, Inc., "Well Servicing Pump Model GD-25000 Quintuplex", Operating and Service Manual, 300FWF996 Revision F, Apr. 2011, 50 pages, Tulsa, OK USA.
C-2500 Quintuplex Well Service Pump, "Intermittent Duty Performance Ratings, Displacement at Pump RPM—Well Stimulation and Intermittent Application", www.gardenerdenver.com, Dec. 7, 2018, 2 pages.
Anonymous, "Reciprocating Plunger Pumps," National Oilwell Varco, Supplement for All Pump Manuals, Revised Sep. 2, 2010: pp. 1-59.
International Search Report dated Oct. 8, 2020, issued in the prosecution of patent application PCT/US2043583, 19 pages.

* cited by examiner

ARTIFICIAL INTELLIGENCE BASED HYDRAULIC FRACTURING SYSTEM MONITORING AND CONTROL

CROSS-REFERENCE TO RELATED APPLICATION

This application claims the benefit of U.S. Provisional Application No. 62/879,239 filed 26 Jul. 2019, which is incorporated herein by reference in its entirety.

TECHNICAL FIELD

This disclosure relates generally to hydraulic fracturing. More particularly, but not by way of limitation, this disclosure relates to utilizing artificial intelligence (AI) techniques in hydraulic fracturing operations to monitor and control hydraulic fracturing equipment on one or more transports for different use cases.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand or ceramic materials) can be pumped into the underground formation to fracture and promote the extraction of the hydrocarbon reserves, such as oil and/or gas. For example, the fracturing fluid may comprise a liquid petroleum gas, linear gelled water, gelled water, gelled oil, slick water, slick oil, poly emulsion, foam/emulsion, liquid carbon dioxide, nitrogen gas, and/or binary fluid and acid.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, large amounts of fuel to power the fracturing operations, and large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes obtaining data of at least one external indicia of operation of at least one component in a hydraulic fracturing fleet, wherein the data is detected with at least one sensor; inputting the obtained data into an Artificial Intelligence (AI) model, the AI model being trained to monitor the operation of the at least one component in the hydraulic fracturing fleet; detecting, with the AI model and based on the input data of the at least one external indicia, one of a plurality of predetermined states corresponding to the operation of the at least one component; and performing a predetermined function based on the detected one of the plurality of predetermined states.

In another embodiment, the method may be embodied in computer executable program code and stored in a non-transitory storage device. In yet another embodiment, the method may be implemented on a system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
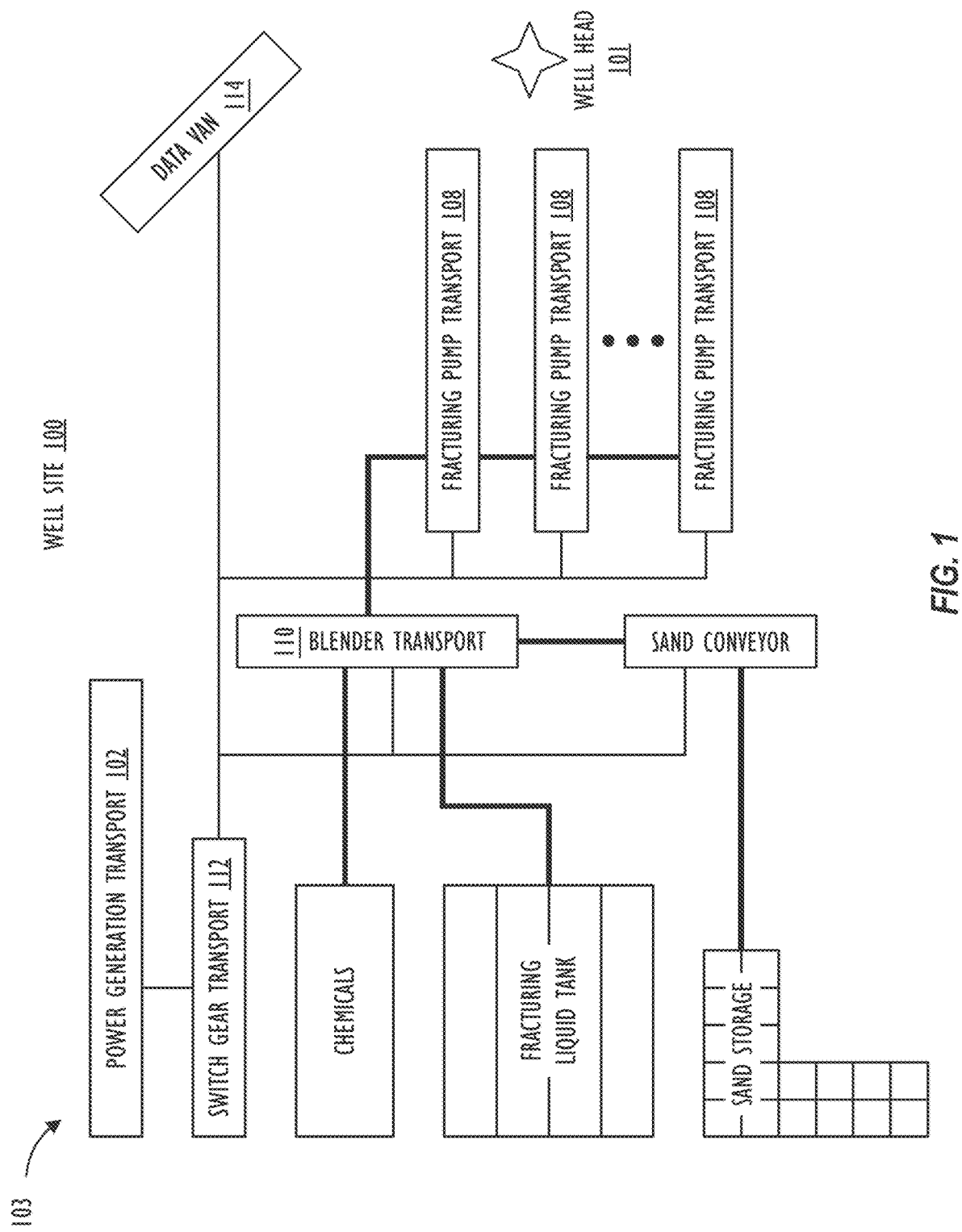
FIG. 1 is a schematic diagram of a mobile hydraulic fracturing system operating at a well site, in accordance with one or more embodiments.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "transport" refers to any transportation assembly, including, but not limited to, a trailer, truck, skid, and/or barge used to transport relatively heavy structures, such as a mobile gas turbine generator.

As used herein, the term "trailer" refers to a transportation assembly used to transport relatively heavy structures, such as a mobile gas turbine generator that can be attached and/or detached from a transportation vehicle used to pull or move the trailer. In one embodiment, the trailer may include the mounts and manifold systems to connect the trailer to other equipment.

As used herein, the term "lay-down trailer" refers to a trailer that includes two sections with different vertical heights. One of the sections or the upper section is positioned at or above the trailer axles and another section or the lower section is positioned at or below the trailer axles. In one embodiment the main trailer beams of the lay-down trailer may be resting on the ground when in operational mode and/or when uncoupled from a transportation vehicle, such as a tractor.

As used herein, the term "gas turbine generator" refers to both the gas turbine and the generator sections of a gas-turbine generator transport (e.g., power generation transport, mobile source of electricity, and the like). The gas turbine generator receives hydrocarbon fuel, such as natural gas, and converts the hydrocarbon fuel into electricity.

As used herein, the term "inlet plenum" may be interchanged and generally referred to as "inlet", "air intake," and "intake plenum," throughout this disclosure. Additionally, the term "exhaust collector" may be interchanged throughout and generally referred to as "exhaust diffuser" and "exhaust plenum" throughout this disclosure.

As used herein, the term "gas turbine inlet filter" may be interchanged and generally referred to as "inlet filter" and "inlet filter assembly." The term "air inlet filter housing" may also be interchanged and generally referred to as "filter housing" and "air filter assembly housing" throughout this disclosure. Furthermore, the term "exhaust stack" may also be interchanged and generally referred to as "turbine exhaust stack" throughout this disclosure.

This disclosure pertains to an AI system that monitors, controls, and communicates with one or more control systems controlling hydraulic fracturing equipment (e.g., apparatuses, components, and the like) on one or more transports of a hydraulic fracturing fleet. Techniques disclosed herein utilize artificial intelligence techniques to detect predetermined states (e.g., different fluid end packing failure states, blender or hopper states, states related to high-pressure leak on iron between pumps and well head, and the like) that may impact operation of hydraulic fracturing equipment (e.g., apparatus, component, and the like) on one or more transports of a hydraulic fracturing fleet or system. The AI system may then perform predetermined operations or functions (e.g., shut down affected hydraulic fracturing apparatus, notify operator, and the like) based on the detected state.

In one embodiment, one or more AI models (e.g., machine learning model, deep learning model, and the like) may be trained to detect predetermined states based on corresponding sensor data (e.g., image data, thermal imaging data, audio data, other sensor data, combination of various sensor data, and the like) of one or more apparatuses (e.g., equipment, components, and the like) on one or more hydraulic fracturing transports of the hydraulic fracturing system. The AI models may correspond to respective use cases for AI-based state detection on the hydraulic fracturing system. For example, an AI model may be trained based on sensor data (e.g., one or more of image data, thermal imaging data, audio data, other sensor data, and the like) associated with a fluid end assembly use case. In the fluid end assembly use case, sensor data of a fluid end assembly of a pump on a fracturing pump transport may be used to detect predetermined states, e.g., a state when the pump starts overheating, a state when it starts smoking, and a state when it begins to leak due to high-pressure sand laden fluid for hydraulic fracturing cutting a groove into a packing bore of the fluid end assembly. The trained AI model for the fluid end use case may then be deployed on the AI system to automatically detect the predetermined states for the fluid end packing use case for each pump of each frac pump transport of the fleet based on corresponding sensor data captured by one or more sensors in real-time, and perform predetermined operations or functions (e.g., shutdown pump, notify operator, alert user in "danger zone" and the like) for the respective fluid end assembly of the pump based on the determined state thereof.

In the fluid end assembly use case, during hydraulic fracturing operations, in the event of a packing failure at the fluid end, if the pump operator does not shut down the pump in a very rapid manner (e.g., within order of seconds), the high-pressure sand laden hydraulic fracturing fluid can cut a groove into the packing bore of the fluid end of the pump, and make the fluid end un-useable without costly and sometimes unreliable repair. This also leads to downtime and sacrifices job performance. By implementing for this use case, an AI model that is trained to automatically and dynamically detect fluid end packing failure states (e.g., state in which fluid end packing begins to smoke, state in which fluid end packing begins to oveheat, state in which fluid end starts to leak high-pressure fluid, a normal operating state, and the like), and perform predetermined operations or functions (e.g., shutdown pump, notify operator, change lubriacation rate of the pump, alert user in "danger zone", and the like) based on the detected state, significant damage to the pump can be prevented and downtime can be reduced.

Additional AI models may similarly be trained for other use cases on the hydraulic fracturing system. That is, other AI models may be trained based on sensor data associated with other hydraulic fracturing equipment (e.g., apparatuses, components, and the like) on one or more transports of the hydraulic fracturing system to detect corresponding predetermined states (e.g., states related to a blender or a hopper on a blender transport, states related to high-pressure leak on iron between pump and well head) for other use cases. The additional AI models may similarly be deployed on the AI system for the additional use cases of the AI system to automatically detect predetermined states the AI models are respectively trained to detect based on sensor data captured by the one or more sensors in real-time, and perform predetermined operations or functions (e.g., shutdown affected components or apparatus, notify operator, alert user in "danger zone", and the like) based on the detected states. Examples of other use cases for the AI system implemented on the hydraulic fracturing system may include use cases associated with any component of the fracturing fleet that includes reciprocating or rotating equipment (e.g., chemical additive unit, indoor mix tubs on blender transport, hopper on blender transport, batch tank on hydration unit, and the like) where it may be beneficial to have sensors (e.g., cameras, thermal imaging system, and the like) installed for monitoring and control.

The AI system disclosed herein may be configured to monitor and control different fracturing components located at well sites. The different fracturing apparatuses, which include, but are not limited to, a blender, hydration unit, sand handling equipment, chemical additive system, fracturing pumps, prime mover, and mobile source of electricity (e.g., power generation transport), may be configured to operate remotely via a control network system (e.g., system including an AI system) that monitors and controls the fracturing equipment using a network topology, such as an Ethernet ring topology or start topology network. The control network system may remove the need for implementing multiple control systems located on and/or in close proximity to the fracturing transports. Instead, a designated location, such as a data van and/or a remote location away from the vicinity of the fracturing equipment may remotely control the hydraulic fracturing equipment on the one or more transports.

FIG. 1 is a schematic diagram an embodiment of well site 100 that comprises wellhead 101 and mobile fracturing system 103 (e.g., hydraulic fracturing fleet or system). Generally, mobile fracturing system 103 may perform fracturing operations to complete a well and/or transform a drilled well into a production well. For example, well site 100 may be a site where operators are in the process of drilling and completing a well. Operators may start the well completion process with drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and mobile fracturing system 103 may be moved onto well site 100 to perform fracturing operations that force relatively high-pressure fracturing fluid through wellhead 101 into subsurface geological formations to create fissures and cracks within the rock. Fracturing system 103 may be moved off well site 100 once the operators complete fracturing operations. Typically, fracturing operations for well site 100 may last several days.

To provide an environmentally cleaner and more transportable fracturing fleet, mobile fracturing system 103 may comprise power generation transport 102 (e.g., mobile source of electricity) configured to generate electricity by converting hydrocarbon fuel, such as natural gas, obtained from one or more other sources (e.g., a producing wellhead) at well site 100, from a remote offsite location, and/or another relatively convenient location near power generation transport 102. Improving mobility of mobile fracturing system 103 may be beneficial because fracturing operations at a well site typically last for several days and the fracturing equipment is subsequently removed from the well site after completing fracturing operation. Rather than using fuel that significantly impacts air quality (e.g., diesel fuel) as a source of power and/or receiving electric power from a grid or other type of stationary power generation facility (e.g., located at the well site or offsite), mobile fracturing system 103 utilizes power generation transport 102 as a power source that burns cleaner while being transportable along with other fracturing equipment. The generated electricity from power generation transport 102 may be supplied to fracturing equipment to power fracturing operations at one or more well sites, or to other equipment in various types of applications requiring mobile electric power generation.

As shown in FIG. 1, power generation transport 102 may be implemented as a single power generation transport in order to reduce the well site footprint and provide the ability for operators to easily move power generation transport 102 to different well sites and/or different fracturing jobs and/or different physical locations. In other embodiments, power generation transport 102 may be implemented using two or more transports. For example, power generation transport 102 may be implemented using a two-transport design in which a first transport may be a power generation transport comprising a turbine (e.g., gas turbine) and a generator, and a second transport may be an inlet and exhaust transport that comprises an inlet plenum providing filtered combustion air for the turbine, and an exhaust stack that securely provides an exhaust system for exhaust air from the turbine.

In addition to power generation transport 102, mobile fracturing system 103 may include switch gear transport 112, at least one blender transport 110, at least one data van 114, and one or more fracturing pump transports 108 that deliver fracturing fluid through wellhead 101 to subsurface geological formations. Switch gear transport 112 may receive electricity generated by power generation transport 102 via one or more electrical connections. In one embodiment, switch gear transport 112 may use 13.8 kilovolts (kV) electrical connections to receive power from power generation transport 102. Switch gear transport 112 may comprise a plurality of electrical disconnect switches, fuses, transformers, and/or circuit protectors to protect the fracturing equipment. The switch gear transport 112 may transfer the electricity received from power generation transport 102 to the electrically connected fracturing equipment of mobile fracturing system 103. Switch gear transport 112 may further comprise a control system to control, monitor, and provide power to the electrically connected fracturing equipment.

In one embodiment, switch gear transport 112 may receive a 13.8 kV electrical connection and step down the voltage to 4.8 kV, which is provided to other fracturing equipment, such as fracturing pump transport 108, blender transport 110, sand storage and conveyor, hydration equipment, chemical equipment, data van 114, lighting equipment, sensor equipment (e.g., image sensor, thermal imaging sensor, light sensor, sound sensor, and the like) and any additional auxiliary equipment used for the fracturing operations. Switch gear transport 112 may step down the voltage to 4.8 kV rather than other voltage levels, such as 600 V, in order to reduce cable size for the electrical connections and the amount of cabling used to connect mobile fracturing system 103. In another embodiment, the voltage step down operation may be performed further downstream from switch gear transport 112. For example, switch gear transport 112 may provide the received 13.8 kV electrical connection directly to the fracturing pump transport 108. The voltage step down operation may then be performed on fracturing pump transport 108. The control system of switch gear transport 112 may be configured to connect to the control network system (e.g., AI system) such that switch gear transport 112 may be monitored and/or controlled from a distant location, such as data van 114 or some other type of control center.

Fracturing pump transport 108 may receive the electric power from switch gear transport 112 to power a prime mover. The prime mover converts electric power to mechanical power for driving one or more pumps. In one embodiment, the prime mover may be a dual shaft electric motor that drives two different pumps. Fracturing pump transport 108 may be arranged such that one pump is coupled to opposite ends of the dual shaft electric motor and avoids coupling the pumps in series. By avoiding coupling the pump in series, fracturing pump transport 108 may continue to operate when either one of the pumps fails or has been removed from fracturing pump transport 108. Additionally, repairs to the pumps may be performed without disconnecting the system manifolds that connect fracturing pump transport 108 to other fracturing equipment within mobile fracturing system 103 and wellhead 101. Fracturing pump transport 108 may be communicatively coupled with an AI system that is configured to detect predetermined states (e.g., states related to fluid end packing failure) that may occur at fracturing pump transport 108 during operation. Configuration of fracturing pump transport 108 is described in further detail in connection with FIGS. 2-11 below.

Blender transport 110 may receive electric power fed through switch gear transport 112 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to fracturing pump transport 108. In one embodiment, the electric blender may be a dual configuration blender that comprises electric motors for the rotating machinery that are located on a single transport, which is described in more detail in U.S. Pat. No. 9,366,114, filed Apr. 6, 2012 by Coli et al. and entitled "Mobile, Modular, Electrically Powered System for use in Fracturing Underground Formations," which is herein incorporated by reference in its entirety. In another embodiment, a plurality of enclosed mixer hoppers may be used to supply the proppants and additives into a plurality of blending tubs. Blender transport 110 may be communicatively coupled with an AI system that is configured to detect predetermined states (e.g., sand overflow, sand level, fluid backup, and the like) that may occur at blender transport 110 during operation. Configuration of blender transport 110 is described in further detail in connection with FIGS. 7-13 below.

Data van 114 may be part of a control network system (e.g., AI system), where data van 114 acts as a control center configured to monitor and provide operating instructions to remotely operate blender transport 110, power generation transport 102, and fracturing pump transport 108 and/or other fracturing equipment within mobile fracturing system 103. For example, data van 114 may implement the AI system that detects occurrence of predetermined states associated with one or more of blender transport 110, power generation transport 102, and fracturing pump transport 108 and/or other fracturing equipment within mobile fracturing system 103. Data van 114 implementing the AI system may further perform predetermined operations or functions based on the detected predetermined state. In one embodiment, data van 114 may communicate via the control network system (e.g., AI system) with the variable frequency drives (VFDs) located within power generation transport 102 and/or switch gear transport 112 that operate and monitor the health of the electric motors used to drive the pumps on fracturing pump transports 108. In one embodiment, data van 114 may communicate with the variety of fracturing equipment using a control network system that has a ring topology (or star topology). A ring topology may reduce the amount of control cabling used for fracturing operations and increase the capacity and speed of data transfers and communication.

Other fracturing equipment shown in FIG. 1, such as fracturing liquid (e.g., water) tanks, chemical storage of chemical additives, hydration unit, sand conveyor, and sandbox storage are known by persons of ordinary skill in the art, and therefore are not discussed in further detail. In one or more embodiments of mobile fracturing system 103, one or more of the other fracturing equipment shown in FIG. 1 may be configured to receive power generated from power generation transport 102. The control network system for mobile fracturing system 103 may remotely synchronize and/or slave the electric blender of blender transport 110 with the electric motors of fracturing pump transports 108. Unlike a conventional diesel-powered blender, the electric blenders may perform rate changes to the pump rate change mounted on fracturing pump transports 108. In other words, if the pumps within fracturing pump transports 108 perform a rate change increase, the electric blender within blender transport 110 may also automatically compensate its rate and ancillary equipment, such as the sand conveyor, to accommodate the rate change. Manual commands from an operator may not be used to perform the rate change.

Power generation transport 102 may be a part of mobile fracturing system 103 used at well site 101 as described in FIG. 1. Power generation transport 102 may be configured to be transportable to different well sites along with other equipment (e.g., fracturing pump transports) that is part of the mobile fracturing system 103 and may not be left behind after completing fracturing operations. Power generation transport 102 may include one or more transports (e.g., a power generation transport, inlet and exhaust transport, and the like) that are configured for minimizing operations for the mobilization and de-mobilization process. For example, power generation transport 102 may improve mobility by enabling a mobilization and de-mobilization time period of about 24 hours. Power generation transport 102 may have a single transport footprint, where the same transport may be used in transportation and operational modes, and be configured as a 'self-sufficient' transport that carries all ancillary equipment for mobile electric power generation. Alternately, power generation transport 102 may have a multi transport footprint including a power generation transport and an inlet and exhaust transport. To provide electric power at one or more locations (e.g., well sites), power generation transport 102 may be designed to unitize and mobilize a gas turbine and a generator adapted to convert hydrocarbon fuel, such as natural gas, into electricity.

Although not shown in FIG. 1, power generation transport 102 may include a variety of equipment for mobile electric power generation including a gas conditioning skid, a black start generator, a power source (e.g., gas turbine), a power source air inlet filter housing, a power source inlet plenum, a power source exhaust collector, an exhaust coupling member, a power source exhaust stack, a gearbox, a generator shaft, a generator, a generator air inlet filter housing, a generator ventilation outlet, a generator breaker, a transformer, a starter motor, and a control system. Other components on power generation transport 102 may include a turbine lube oil system, a fire suppression system, a generator lube oil system, and the like.

In one embodiment, the power source may be a gas turbine. In another embodiment, power source may be another type of power source (e.g., diesel engine). The gas turbine may generate mechanical energy (e.g., rotation of a shaft) from a hydrocarbon fuel source, such as natural gas, liquefied natural gas, condensate, and/or other liquid fuels. For example, a shaft of the gas turbine may be connected to the gearbox and the generator such that the generator converts the supplied mechanical energy from the rotation of the shaft of the gas turbine to produce electric power. The gas turbine may be a commercially available gas turbine such as a General Electric NovaLT5 gas turbine, a Pratt and Whitney gas turbine, or any other similar gas turbine. The generator may be a commercially available generator such as a Brush generator, a WEG generator, or other similar generator configured to generate a compatible amount of electric power. For example, the combination of the gas turbine, the gearbox, and the generator within power generation transport 102 may generate electric power from a range of at least about 1 megawatt (MW) to about 36 MW (e.g., 5.6 MW or 32 MW). Other types of gas turbine/generator combinations with power ranges greater than about 36 MW or less than about 1 MW may also be used depending on the application requirement. In one embodiment, to increase mobility of power generation transport 102 and so that power generation transport 102 can be configured as a single transport, the gas turbine may be configured to fit within a dimension of about 14.5 feet long and about 4 feet in diameter and/or the generator may be configured to fit within a dimension of about 18 feet long and about 7 feet wide.

As discussed above with reference to FIG. 1, the mobile fracturing system 103 includes a number of (mechanical and electrical) components that operate under harsh conditions. Careful monitoring of the operation of these components with the AI system disclosed herein can help keep the fracturing system 103 operational and can avoid failures, lost operation time, etc. The fracturing pump transport 108 of the hydraulic fracturing fleet 103 has mechanical components that can be monitored and controlled by the disclosed AI system of the present disclosure.

Figure 2A:
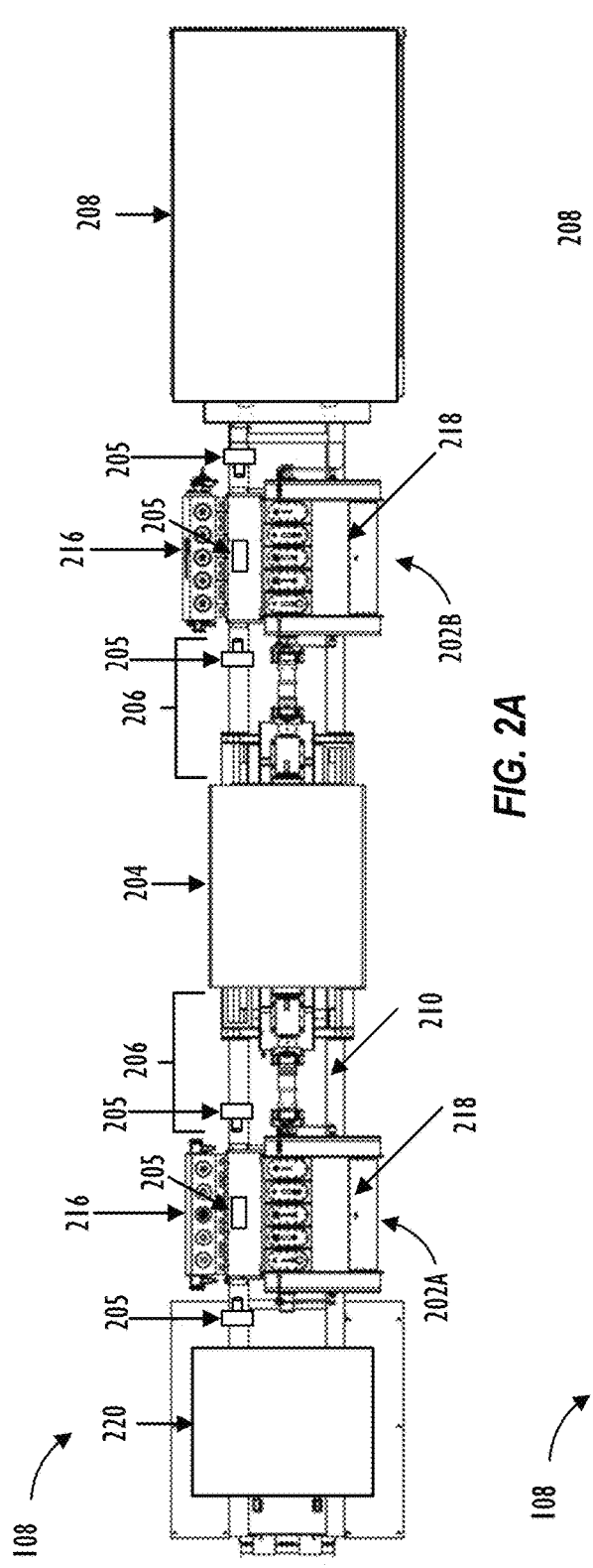
FIG. 2A is a schematic diagram of an embodiment of a fracturing pump transport that is able to engage or disengage one or more pumps from a prime mover.
Figure 2B:
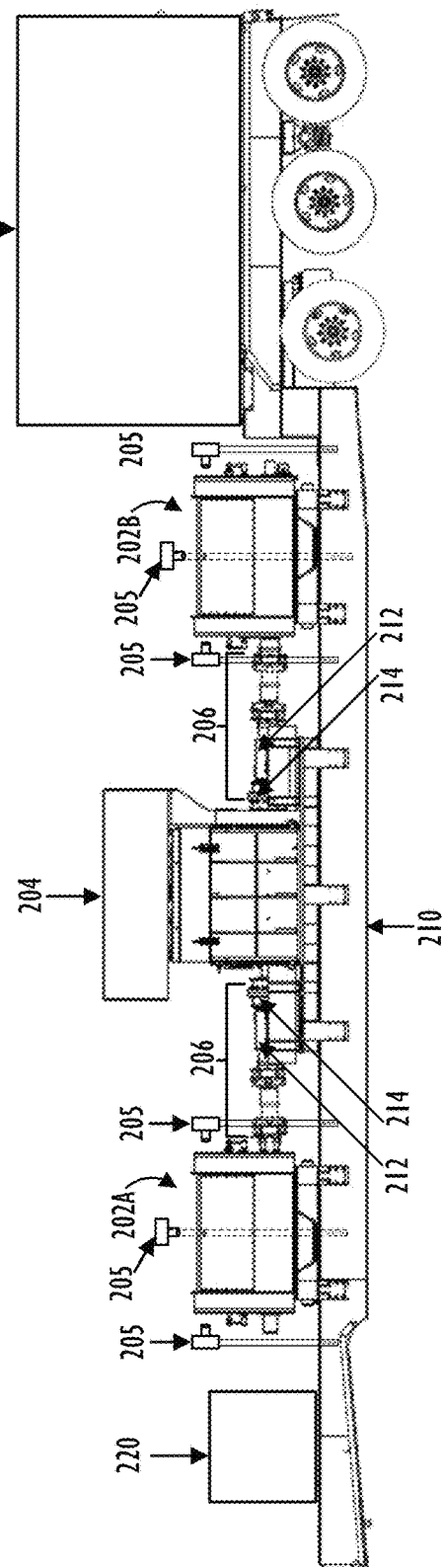
FIG. 2B is a schematic diagram of an embodiment of the fracturing pump transport that is able to engage or disengage one or more pumps from the prime mover.

To that end, discussion turns to FIGS. 2A and 2B, which are schematic diagrams of embodiments of fracturing pump transport 108 powered by power generation transport 102 as described in FIG. 1. Fracturing pump transport 108 may include prime mover 204 powering two separate pumps 202A and 202B. By combining a single prime mover 204 attached to two separate pumps 202A and 202B on a transport, a fracturing operation may reduce the amount of pump transports, prime movers, variable frequency drives (VFD's), ground iron, suction hoses, and/or manifold transports. Although FIGS. 2A and 2B illustrate that fracturing pump transport 108 supports a single prime mover 204 powering two separate pumps 202A and 202B, other embodiments of fracturing pump transport 108 may include a plurality of prime movers 204 that power respective one of pumps 202A and 202B.

Fracturing pump transport may include trailer 210 having a "lay-down" design. Such a design may provide mobility, improved safety, and enhanced ergonomics for crew members to perform routine maintenance and operations of the pumps since the "lay-down" arrangement positions pumps 202A and 202B lower to the ground as the main trailer beams are resting on the ground for operational mode. As shown in FIGS. 2A and 2B, "lay-down" trailer 210 has an upper section above the trailer axles that could hold or have mounted fracturing pump trailer power and control system 208. Fracturing pump trailer power and control system 208 may comprise one or more electric drives, transformers, controls (e.g., a programmable logic controller (PLC) located on the fracturing pump transport 108), and cables for connection to the drive power trailers and/or a separate electric pumper system. The electric drives may provide control, monitoring, and reliability functionality, such as preventing damage to a grounded or shorted prime mover 204 and/or preventing overheating of components (e.g., semiconductor chips) within the electric drives. The lower section of lay-down trailer 210, which may be positioned lower than the trailer axles, may hold or have mounted prime mover 204 and pumps 202A and 202B attached on opposite sides of each other.

In one embodiment, prime mover 204 may be a dual shaft electric motor that has a shaft that protrudes on opposite sides of the electric motor. The dual shaft electric motor may be any desired type of alternating current (AC) or direct current (DC) motor. In one embodiment, the dual shaft electric motor may be an induction motor. In another embodiment the dual shaft electric motor may be a permanent magnet motor. Other embodiments of prime mover 204 may include other electric motors that are configured to provide about 5,000 HP or more. For example, the dual shaft electric motor may deliver motor power in a range from about 1,500 HP to about 10,000 HP. Specific to some embodiments, the dual shaft electric motor may be about a 5,000 HP rated electric motor or about a 10,000 HP electric motor. Prime mover 204 may be driven by at least one variable frequency drive that is rated to a maximum of about 5,000 HP and may receive electric power generated from power generation transport 102.

As shown in FIGS. 2A and 2B, one side of prime mover 204 drives one pump 202A and the opposite side of prime mover 204 drives a second pump 202B. Pumps 202A and 202B are not configured in a series configuration in relation to prime mover 204. In other words, prime mover 204 independently drives each pump 202A and 202B such that if one pump fails, it can be disconnected, and the other pump can continue to operate. Prime mover 204, which could be a dual shaft electric motor, eliminates the use of diesel engines and transmissions. Moreover, using a dual shaft electric motor on a transport may prevent dissonance or feedback when transferring power to pumps 202A and 202B. In one embodiment, prime mover 204 may be configured to deliver at least about 5,000 HP distributed between the two pumps 202A and 202B. For instance, prime mover 204, which may be a dual shaft electric motor, may provide about 2,500 HP to one of the pumps 202A and about 2,500 HP to the other pump 202B in order to deliver a total of about 5,000 HP. Other embodiments may have prime mover 204 deliver less than 5,000 HP or more than 5,000 HP. For example, prime mover 204 may deliver a total of about 3,000 HP by delivering about 1,500 HP to one of the pumps and about 1,500 HP to the other pump. Another example may have prime mover 204 deliver a total of about 10,000 HP by delivering about 5,000 HP to one of the pumps 202A and about 5,000 HP to the other pump 202B. Specifically, in one or more embodiments, prime mover 204 may operate at HP ratings of about 3,000 HP, 3,500 HP, 4,000 HP, 4,500 HP, 5,000 HP, 5,200 HP, 5,400 HP, 6,000 HP, 7,000 HP, 8,000 HP, 9,000 HP, and/or 10,000 HP.

Fracturing pump transport 108 may reduce the footprint of fracturing equipment on a well-site by placing two pumps 202A and 202B on a single transport. Larger pumps may be coupled to a dual shaft electric motor that operates with larger horse power to produce additional equipment footprint reductions. In one embodiment, each of pumps 202A and 202B may be quintuplex pumps located on a single transport. Other embodiments may include other types of plunger style pumps, such as triplex pumps. Pumps 202A and 202B may each operate from a range of about 1,500 HP to about 5,000 HP. Specifically, in one or more embodiments, each of pumps 202A and 202B may operate at HP ratings of about 1,500 HP, 1,750 HP, 2,000 HP, 2,250 HP, 2,500 HP, 2,600 HP, 2,700 HP, 3,000 HP, 3,500 HP, 4,000 HP, 4,500 HP, and/or 5,000 HP. Pumps 202A and 202B may not be configured in a series configuration where prime mover 204 drives a first pump 202A and the first pump 202B subsequently drives a second pump 202B.

Prime mover 204 and each of pumps 202A and 202B may be mounted on sub-assemblies configured to be isolated and allow for individual removal from fracturing pump transport 108. In other words, prime mover 204 and each of pumps 202A and 202B can be removed for service and replaced without shutting down or compromising other portions of fracturing pump transport 108. That is, prime mover 204 and pumps 202A and 202B may be connected to each other via couplings that are disconnected when removed from fracturing pump transport 108. If prime mover 204 needs to be replaced or removed for repair, prime mover 204 sub-assembly may be detached from fracturing pump transport 108 without removing the two pumps 202A and 202B from fracturing pump transport 108. Similarly, pump 202A can be isolated from fracturing pump transport 108, removed, and replaced by a new pump 202A. If prime mover 204 and/or pumps 202A and 202B require service, an operator can isolate the different components from the fluid lines, and unplug, un-pin, and remove prime mover 204 and/or pumps 202A and 202B from fracturing pump transport 108. Furthermore, each pump 202A/202B sub-assembly may be detached and removed from fracturing pump transport 108 without removal of the other pump 202A/202B and/or prime mover 204. As such, fracturing pump transport 108 may not need to be disconnected from the manifold system and driven out of location at the well site. Instead, replacement prime mover 204 and/or pumps 202A and 202B may be placed back into the line and reconnected to fracturing pump transport 108.

To implement independent removal of the sub-assemblies, the two pumps 202A and 202B may be coupled to prime mover 204 using respective drive line assemblies 206, each of which is adapted to provide local or remote operation to engage or dis-engage respective one of pumps 202A and 202B from prime mover 204. Each drive line assembly 206 may comprise one or more couplings and a drive shaft. For example, drive line assembly 206 may comprise a fixed coupling that connects to one of pumps 202A or 202B and a corresponding keyed shaft 212. Keyed shaft 212 may interconnect the fixed coupling to a corresponding splined toothed coupling 214 that is attached to prime mover 204. To engage or disengage one or both pumps 202A and 202B from prime mover 204, each spline toothed coupling 214 may include a splined sliding sleeve motor and pump coupling that provides motor shaft alignment and provides for a hydraulic fluid powered for connection and disconnection of the sliding sleeve motor and pump coupling. Other embodiments of the couplings may include torque tubes, air clutches, electro-magnetic clutches, hydraulic clutches, and/or other clutches and disconnects that have manual and/or remote operated disconnect devices.

FIGS. 2A-2B illustrate that fracturing pump transport 108 includes engagement panel 220 for adjusting each spline toothed coupling 214 to engage and disengage pumps 202A and 202B from prime mover 204. As an example, engagement panel 220 includes levers or switches that an operator manually operates to engage or disengage one or both pumps 202A and 202B from prime mover 204. Additionally, or alternatively, to engage or disengage one or both pumps 202A and 202B from prime mover 204, engagement panel 220 may include electronic controllers that receive instructions from remote locations, such as a monitoring station that is part of power and control system 208, another location at the well site (e.g., AI system on data van 114), and/or off-site via a network (e.g., the Internet). For example, if both pumps 202A and 202B are initially in an engaged position, in response to receiving a remote command, engagement panel 220 may trigger disengagement of one pump 202B (so as to stop fluid pumping operation of pump 202B) while the other pump 202A remains in the engaged position (so as to allow pump 202A to pump high-pressure fluid into wellhead 101).

FIGS. 2A-2B further illustrate that each of pumps 202A and 202B includes fluid end assembly 216 and power end assembly 218 that couples to a corresponding fluid end assembly 216. Each power end assembly 218 generates torque to drive a corresponding fluid end assembly 216 (e.g., plungers) of each of pumps 202A and 202B. Power end assembly 218 may include a gear box including pinion gears and/or bull gears that rotate based on torque input from the drive shaft of drive line assembly 206 driven by prime mover 204. Rotating the pinion gears causes the bull gears to rotate, which in turn causes rotation of a crankshaft within power end assembly 218 of pumps 202A and 202B. Rotation of the crankshaft then produces torque that moves plungers in fluid end assembly 216 of pumps 202A and 202B to pump and pressurize fracturing fluid into wellhead 101. Pumps 202A and 202B are illustrated in greater detail in FIGS. 3A and 3B.

Figure 3A:
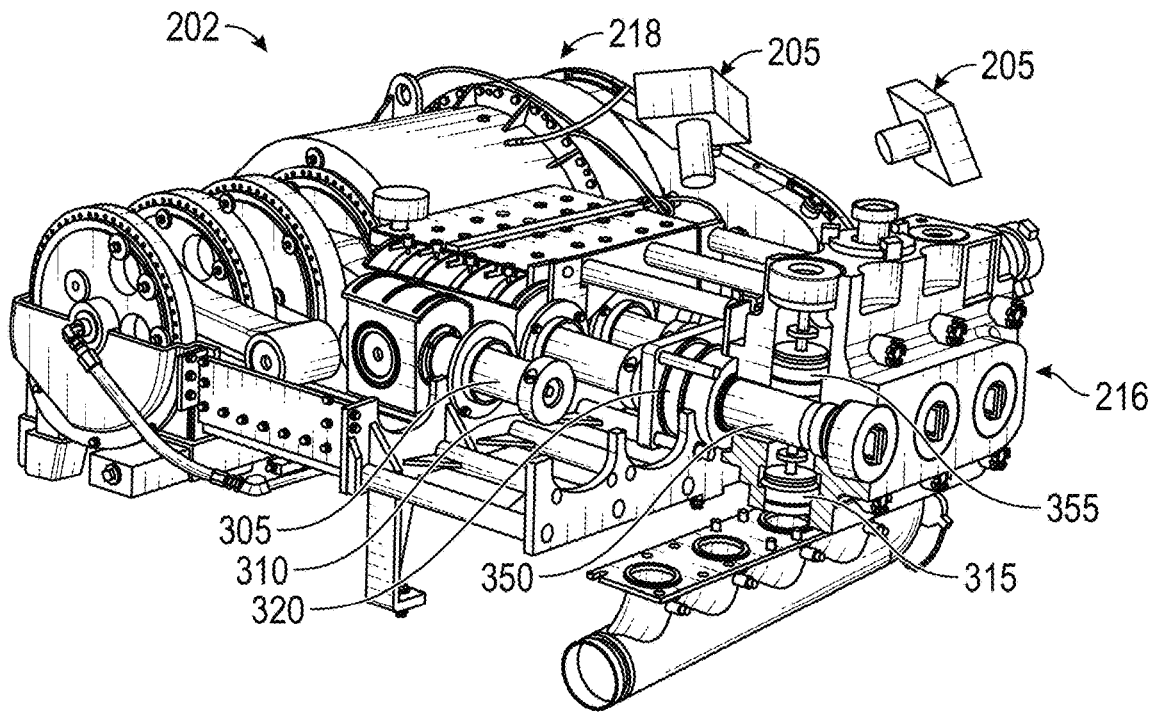
FIG. 3A illustrates a cross-section view of an exemplary pump provided on the fracturing pump transport in accordance with one or more embodiments.
Figure 3B:
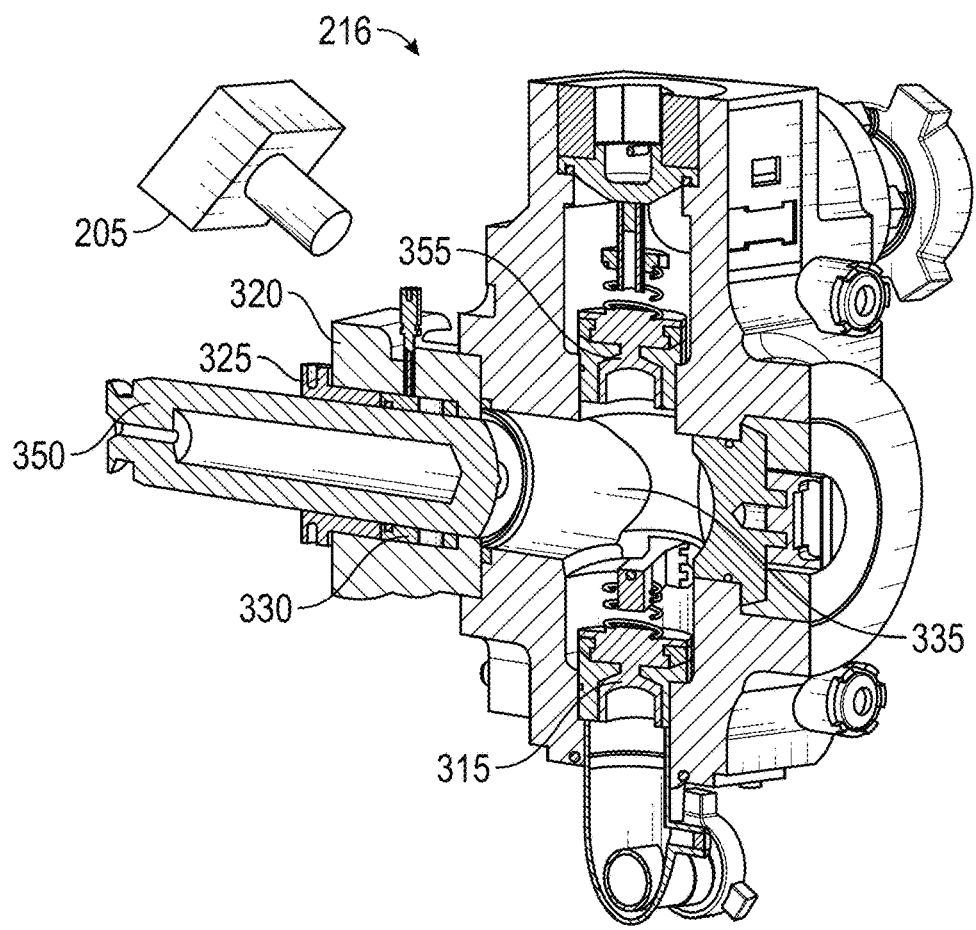
FIG. 3B illustrates a cross-section view of a fluid end assembly of the exemplary pump provided on the fracturing pump transport in accordance with one or more embodiments.

In particular, FIG. 3A illustrates an exposed view of pump 202 (e.g., pump 202A or 202B) provided on fracturing pump transport 108 in accordance with one or more embodiments. FIG. 3B illustrates a cross-section view of fluid end assembly 216 of pump 202 provided on fracturing pump transport 108 in accordance with one or more embodiments. As shown in FIGS. 3A-3B, pump 202 may be a reciprocating, positive displacement, horizontal single-acting pump in which rotational motion from a prime mover (e.g., prime mover 204) at a given horsepower is applied to an input shaft flange. Power end assembly 218 of pump 202 may convert rotational motion into linear reciprocating motion of plunger 350. In turn, plungers 350 of fluid end assembly 216 reciprocate in fluid end assembly 216 displacing a fixed volume of fluid with a suction stroke for incoming fluid from suction end 315, and a power stroke for discharge fluid from discharge end 355. Fluid may thus be compressed to discharge pressure and pushed through discharge end 355.

Power end assembly 218 may include multiple sub-assemblies including a crankshaft housing, a crosshead section, a spacer section, and a gearbox. As shown in FIGS. 3A-3B, pump 202 may, for example, be a quintuplex pump in which five pony rods 305 of the crosshead section of power end assembly 218 are respectively coupled to five plungers 350 of fluid end assembly 216 via corresponding pony rod clamps 310. Pony rods 305 may be actuated by the crankshaft sub-assembly of power end assembly 218 to generate linear reciprocating motion, and in turn, linearly reciprocate respective plungers 350 in and out of fluid end assembly 216 on the suction and discharge strokes to pump high-pressure fluid (e.g., mixture of sand and water for hydraulic fracturing) into wellhead 101.

Each plunger 350 may be configured to move in and out of a main cylinder of fluid end assembly 216 via a corresponding plunger bore 335. The plunger 350 may be made of a lower carbon steel and may have a wear finish deposited and polished thereon to a smooth surface for proper sealing. Each plunger bore 335 may receive a corresponding plunger 350, which is reciprocated in the plunger bore 335 to pump fluid through respective discharge ends 355. The plunger end of each plunger bore 335 is sealed by packing in stuffing box 320. The packing in stuffing box 320 for each plunger 350/plunger bore 335 combination may include multiple components including a series of packing elements (e.g., packing ring 330). Packing nut or gland 325 may be provided around an outer periphery of plunger 350 to compress the packing and to provide a high-pressure seal. A packing wiper seal received in a peripheral groove in packing nut 325 may seal stuffing box 320. Lubrication ports may also be provided that permit lubricant to be pumped into stuffing box 320 to provide lubrication between plunger 350 and plunger bore 335, between plunger 350 and packing nut 325, and between plunger 350 and stuffing box 320.

As explained previously, the packing in stuffing box 320 may fail during operation due to a variety of reasons. For example, one or more of the series of packing elements (e.g., packing ring 330) or packing nut 325 may fail during operation because of wear, lack of ample lubrication, poor lubrication, packing in stuffing box 320 being too tight or too loose around plunger 350, packing nut 325 being too tight or too loose, and the like. The packing in stuffing box 320 or packing nut 325 may begin to fail. Seals in the packing nut 325 may become worn, and may washout or start washboarding. Proper lubrication of the plunger packing may be lost, increasing friction. Sand (or other additive) in the hydraulic fracking fluid mixture may get wedged in the packing and start to cut away on the series of packing elements or on plunger 350 while it is linearly reciprocating with respect to fluid end assembly 216. As a result of this friction, plunger 350 (or other components of fluid end assembly 216 and/or power end assembly 218) may get hot, begin to smoke, and/or a high-pressure stream of the fluid and sand mixture may begin to escape out of the washout or cut formed in the packing in stuffing box 320, packing nut 325, or plunger 350. The smooth surface of the plunger 350 may develop wear, pits, nicks, or burs that can further damage the stuffing box 320 and can lead to leaking. Scale, buildup, or cracks may also develop on the plunger 350, compromising sealing.

In order to monitor the current state of fluid end assembly 216 during operation, as shown in FIGS. 2A-2B and 3A-3B, fracturing pump transport 108 may include one or more sensors 205. Sensor 205 can be exposed to an external environment of at least one mechanical component of the fracturing pump transport 108, such as the fluid end assembly 216 of pump 202 or a portion thereof. Sensor 205 is configured to detect at least one external indicia of the operation of the at least one mechanical component. In general, sensor 205 can be an imaging sensor detecting visual characteristics, a thermal sensor detecting thermal characteristics, an acoustic sensor detecting sound, and a motion sensor detecting motion related to the operation of the at least one mechanical component. Proper operation of the mechanical component would be indicated by a consistent pattern of imaging, thermal, acoustic, and motion detections. A change in this consistent pattern would thereby equate to a potential issue with the operation of the mechanical component, such as indications of a failure, a leak, or the like.

Overall, sensors 205 may include one or more of a plurality of types of sensors including acoustic or sound sensors (e.g., microphone and the like); optical, light or imaging sensors (e.g., charge coupled device (CCD) sensor, complimentary metal-oxide semiconductor (CMOS) sensor, electro-optical sensor, colorimeter, infrared sensor, thermal imaging sensor, and the like); flow or fluid velocity sensor (e.g., flow sensor and the like); environment or weather sensor; thermal, heat sensor; position, angle, displacement, distance, speed or acceleration sensor (e.g., laser rangefinder and the like); and the like. For example, sensors 205 may include an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer, a momentum sensor, a pump pressure sensors, and a wave radar probe.

In the example embodiment shown in FIGS. 2A-2B and 3A-3B, three sensors 205 are illustrated as being positioned on either side of and on top of fluid end assembly 216 of each pump 202A and 202B of each frac pump transport 108. However, this may not necessarily be the case. The number, type, position, angle, and other characteristics of sensors 205 are not intended to be limiting to that shown in the drawings, and may be determined based on the use case (e.g., what equipment, apparatuses, or components of the hydraulic fracturing system 103 are being monitored), and the types of predetermined states (e.g., what are the relevant operational states of the monitored equipment or component) that are being monitored by sensors 205.

As one non-limiting example, sensors 205 may be imaging sensors (e.g., digital camera) that are positioned to face plungers 350 of fluid end assembly 216 of each pump 202A and 202B of each transport 108 to detect fluid end packing states. For example, as shown in FIGS. 3A-3B, one or more sensors 205 (e.g., cameras) may be positioned on each pump 202A or 202B of each frac pump transport 108 at fluid end assembly 216 to provide a video feed of plungers 350 that are linearly reciprocating with respect to the main cylinder of fluid end assembly 216, and more particularly, with respect to the stationary packing nut 325 and packing in stuffing box 320 provided on the main cylinder of fluid end assembly 216. One (or more) camera may be positioned for each plunger 350 so that its frame of view includes one plunger's 350 reciprocating motion with respect to the stationary packing nut 325 and stuffing box 320 provided on the main cylinder of fluid end assembly 216.

Figure 4:
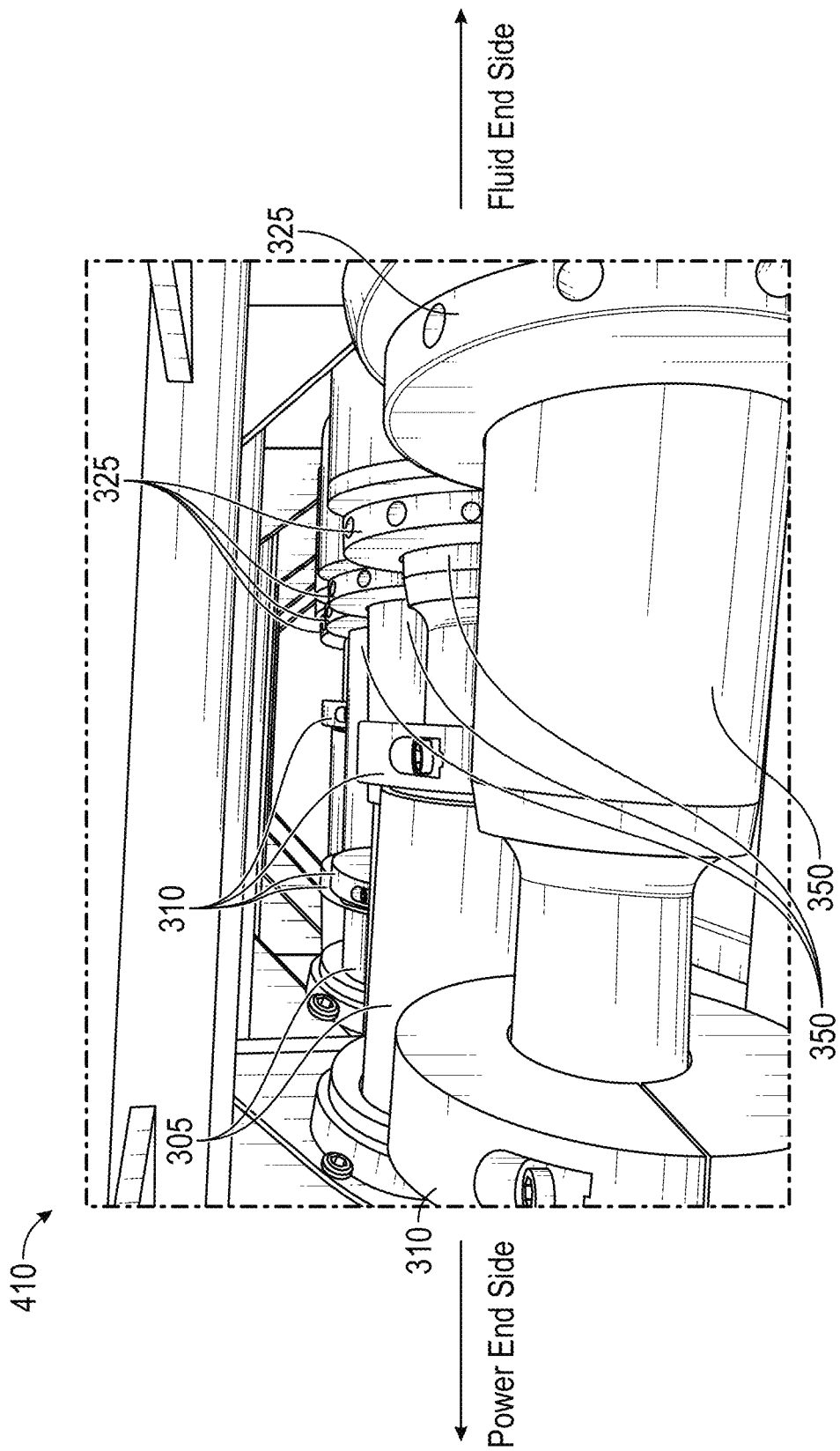
FIG. 4 illustrates an example of an image of the fluid end assembly that is captured by a sensor in accordance with one or more embodiments.
Figure 5:
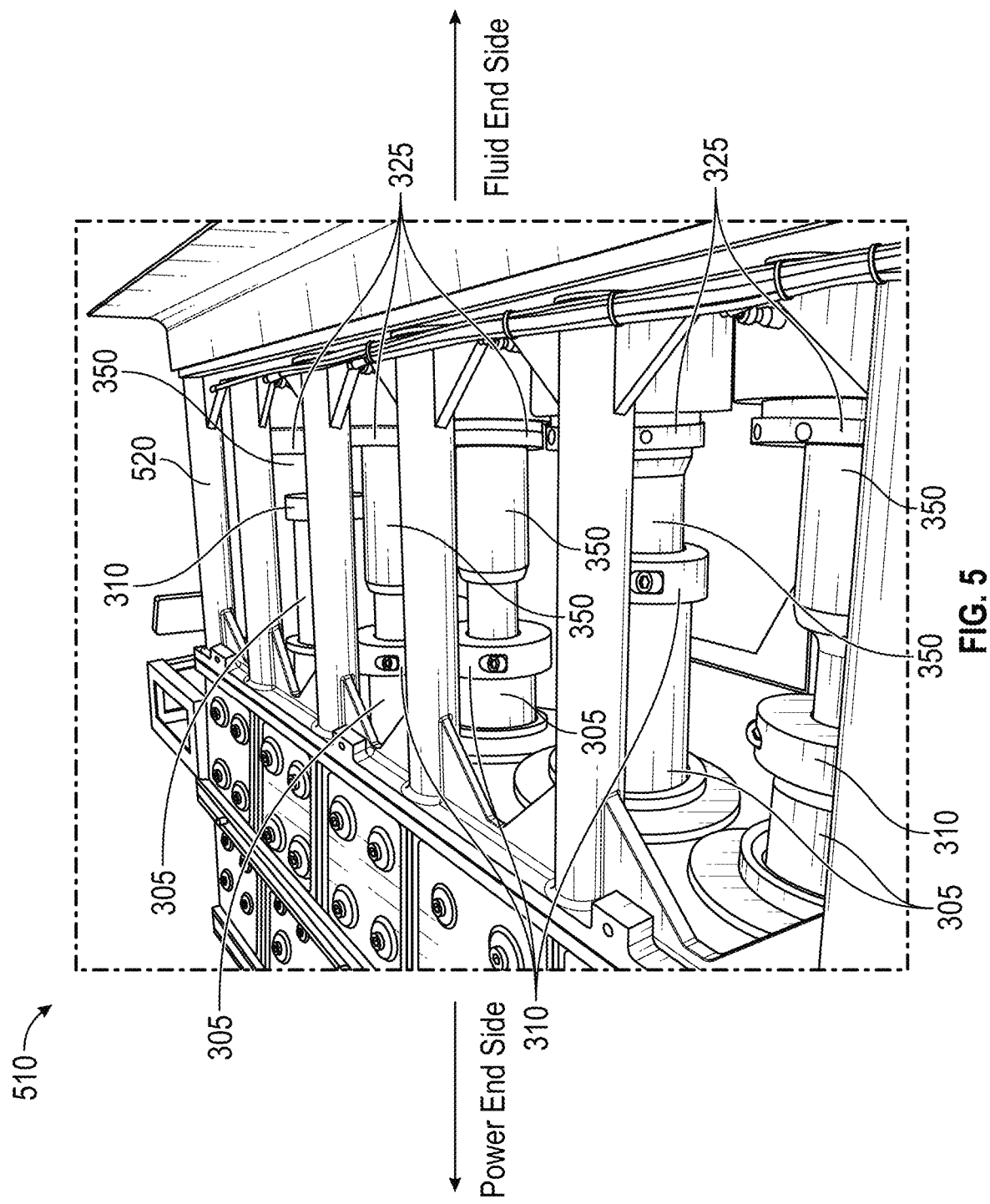
FIG. 5 illustrates another example of an image of the fluid end assembly that is captured by a sensor in accordance with one or more embodiments.

Alternately, one (or more) cameras may be positioned for each pump 202 so that its frame of view includes all plungers 350 in reciprocating motion with respect to corresponding stationary packing nuts 325 and packings in stuffing boxes 320 in corresponding plunger bores 335 on the main cylinder of pump 202. For example, as shown in FIG. 4, sensor 205 (e.g., camera) may be positioned relative to pump 202 so that image data 410 output by sensor 205 may show each pony rod 305, each pony rod clamp 310, each plunger 350, and each packing nut 325 of pump 202. As another example, as shown in FIG. 5, sensor 205 (e.g., camera) may be positioned at an elevated position relative to pump 202 so that image data 510 output by sensor 205 may show spacer section 520 of power end assembly 218, as well as show each pony rod 305, each pony rod clamp 310, each plunger 350, and each packing nut 325 of pump 202.

With respect to the sensors 205 being imaging sensors to detect the fluid end packing states, the imaging sensors 205 image the reciprocation of the plungers 350 relative to the stuffing boxes 320, packing gland 325, packing ring 330, etc. During the repeated reciprocation, the imaging sensors 205 can image the external features and environment around these components during normal operation. When a leak or failure begins, the consistent nature of the imaging will change as the imaging sensor 205 detects smoke emanating from worn or over-heated elements, burst of high-pressure fluid leaking from the elements, mist, spray, or foam caused by leak of the high-pressure fluid from the components around plungers 350, and the like.

As another non-limiting example, one or more of sensors 205 may be a thermal imaging sensor that is configured to detect thermal characteristics (e.g., temperature) of plungers 350 and surrounding equipment (e.g., packing nut 325, stuffing box 320, main cylinder of fluid end assembly 216, and the like). Performing thermal imaging, sensors 205 image the reciprocation of the plungers 350 relative to the stuffing boxes 320, packing gland 325, packing ring 330, etc. During the repeated reciprocation, the thermal imaging sensors 205 can image the thermal signature and environment around these components during normal operation. When a leak or failure begins, the consistent nature of the thermal signature will change as the thermal imaging sensor 205 detects hot smoke emanating from worn or over-heated elements, burst of high-pressure fluid leaking from the elements, increase in temperature of plunger 350, and surrounding equipment, and the like.

As noted, the sensors 205 can include acoustic sensors (e.g., microphone and the like) to monitor the acoustic environment of the plungers 350 and surrounding equipment (e.g., packing nut 325, stuffing box 320, main cylinder of fluid end assembly 216, and the like). The acoustic sensors 205 can detect the acoustic signature of the repeated reciprocation of these components during normal operation. When a leak or failure begins, the consistent nature of the acoustic signature will change as the acoustic sensor 205 detects predetermined (learned) acoustic signatures representing burst of high-pressure fluid leaking from the elements, mist, spray, or foam caused by leak of the high-pressure fluid from the components around plungers 350, and the like.

As a vibration sensor detecting vibration, the sensor 205 can monitor vibrations in the environment of the plungers 350 and surrounding equipment (e.g., packing nut 325, stuffing box 320, main cylinder of fluid end assembly 216, and the like). The vibration sensors 205 can detect the vibrational signature of the repeated reciprocation of these components during normal operation. When a leak or failure begins, the consistent nature of the vibrational signature will change as the vibration sensor 205 detects predetermined (learned) vibrational signatures representing overheated components, burst of high-pressure fluid leaking from the elements, mist, spray, or foam caused by leak of the high-pressure fluid from the components around plungers 350, and the like.

As yet another non-limiting example, one or more sensors 250 may include a combination of sensors like imaging sensors, thermal imaging sensors, audio sensors, flow sensors, and the like for each piece of equipment of hydraulic fracturing system 103 being monitored by the AI system.

Returning to FIGS. 2A-2B, the one or more sensors 205 may be configured to capture data (e.g., still-image data, moving-image data, audio data, thermal still- or moving-image data, other sensor data, and the like) of plungers 350 of pump 202 during operation and transmit the generated sensor data to fracturing pump trailer power and control system 208, data van 114 (e.g., implementing AI system), and/or to another remote-control network system. In one embodiment, the sensor data may be generated and transmitted continuously or at pre-determined intervals, based on an operation state of pump 202.

By monitoring data (e.g., image data 410 or 510) generated by one or more sensors 205, predetermined states associated with pump 202 can be detected by, e.g., an operator monitoring the data in real-time. However, as mentioned previously, in the event of a fluid end packing failure state where high-pressure fluid stream starts leaking out of fluid end assembly 216, if the pump operator does not shut down the pump in a very rapid manner (e.g., within order of seconds), the high-pressure sand (or other additive) laden hydraulic fracturing fluid can cut a groove into the packing bore of the fluid end of the pump, and make the fluid end un-useable without costly and sometimes unreliable repair. It is desirable to automatically and dynamically detect predetermined states based on sensor data associated with one or more transports of the hydraulic fracturing system 103 and automatically perform predetermined operations or functions based on the detected predetermined states, in order to avoid damage to hydraulic fracturing equipment and minimize costly downtime.

Figure 6:
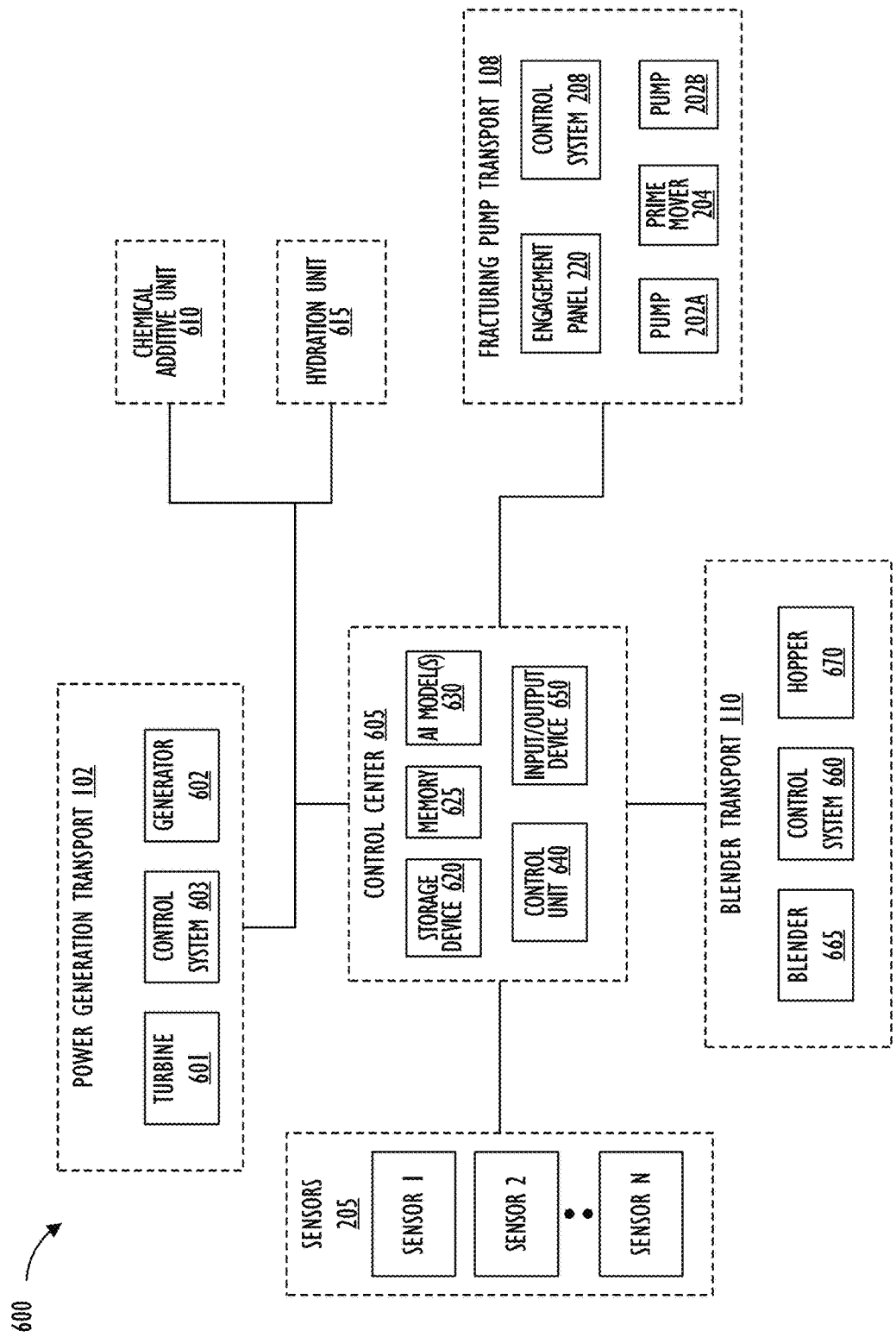
FIG. 6 is a block diagram of an embodiment of an AI system that monitors, controls, and communicates with one or more control systems associated with one or more transports of the hydraulic fracturing system.

FIG. 6 is a block diagram of an embodiment of AI system 600 that monitors, controls, and communicates with one or more control systems associated with one or more transports (e.g., power generation transport 102, fracturing pump transport 108, blender transport 110, switch gear transport 112, and the like) of hydraulic fracturing system 103. One use case for AI system 600 may be to detect occurrence of one or more predetermined states (e.g., overheating state, smoking state, fluid end packing failure (leaking) state, and the like) for fluid end assemblies 216 (e.g., apparatuses) of one or more frac pump transports 108 as described above in connection with FIGS. 2A-5. Other use cases for AI system 600 may be to detect occurrence of one or more predetermined states for other hydraulic fracturing equipment, components, or apparatuses on fracturing pump transport 108, or on one or more of the other transports (e.g., blender transport 110, power generation transport 102, and the like) based on corresponding sensor data generated by corresponding sensors 205 and configured for the particular use case (or the particular apparatuses).

AI system 600 may be implemented as a control network system that monitors, controls, and communicates with one or more control systems of hydraulic fracturing system 103. In one embodiment, AI system 600 may include control center 605 that may be implemented on data van 114. Alternately, or additionally, control center 605 may be implemented in a distributed manner on one or more control systems associated with one or more transports (e.g., power generation transport 102, fracturing pump transport 108, blender transport 110, switch gear transport 112, data van 114, and the like) of hydraulic fracturing system 103. In yet another embodiment, control center 605 may be implemented on a computer system that is separate from data van 114 and the control systems of the one or more transports of fracturing system 103. For example, control center 605 may be implemented on a remote computer system (e.g., remote well site computer system) that is communicatively coupled to data van 114 and the control systems of the one or more transports of fracturing system 103 via a network (e.g., the Internet). As another example, control center 605 may be implemented on a cloud-based computing system.

AI system 600 may be implemented using any suitable network topology (e.g., ring topology, star topology, mesh topology, bus topology, and the like) that interconnects control center 605, blender transport(s) 110, chemical additive unit 610, hydration unit 615, fracturing pump transport(s) 108, sensors 205, and power generation transport 102. In one embodiment, AI system 600 may be implemented as a ring topology network that may reduce the amount of control cabling used for fracturing operations and increase the capacity and speed of data transfers and communication. Additionally, the ring topology may allow for two-way communication and control by control center 605 for equipment connected to control center 605. For example, control center 605 may be able to monitor and control other fracturing equipment and third-party equipment when added to AI system 600, and for multiple pieces of equipment to communicate with each other. In one embodiment, AI system 600 may be a network, such as an Ethernet network that connects and communicates with individual control systems for each fracturing transport (e.g., one or more of power generation transport 102, fracturing pump transport 108, blender transport 110, switch gear transport 112, data van 114 and the like). Control center 605 may be configured to monitor, control, and provide operating instructions to different fracturing equipment on the one or more transports of fracturing system 103. For example, control center 605 may communicate with engagement panel 220 located within fracturing pump transport 108 to operate prime mover 204 and one or both pumps 202A and 202B.

As shown in FIG. 6, control center 605 of AI system 600 may include storage device 620, memory 625, one or more AI models 630, control unit 640, and input/output devices 650. Storage device 620 and memory 625 may store and/or retrieve data, which can include sensor data from one or more sensors 205, AI model data for one or more use cases (or corresponding apparatuses), data associated with power generation transport 102, data associated with chemical additive unit 610, data associated with hydration unit 615, data associated with power generation transport 102, data associated with blender transport 110, data describing input/output devices 650, and/or metadata associated with the data. Memory 625 of control center 605 may be implemented using any suitable (volatile and/or non-volatile) memory technology to store program instructions and data associated with control center 605.

Control center 605 may also include input/output devices 650. For example, input/output devices 650 may include at least one of the following: (i) one or more input devices that interact with or send data to one or more components of control center 605 (e.g., mouse, keyboards, wireless Bluetooth® peripheral, etc.); (ii) one or more output devices that provide output from one or more components of control center 605 (e.g., internal or built-in monitors, printers, haptic feedback devices/systems, etc.); or (iii) one or more storage devices that store data in addition to memory 625 and storage device 620. (Bluetooth® is a registered trademark of Bluetooth SIG, Inc, Washington, USA). Input/output devices 650 may combine different devices into a single hardware component that can be used both as an input and output device (e.g., a touchscreen, and the like).

Control unit 640 may include CPUs, GPUs, digital signal processors (DSPs), and/or other types of integrated circuits (ICs). Control unit 640 may also contain circuits such as memory, processors, application specific integrated circuits, and other storage and processing circuitry. Control unit 640 may be configured to communicate with other components of AI system 600 such as sensors 205, power generation transport 102, blender transport 110, fracturing pump transport 108, and the like. Control unit 640 may enable AI model 630 to detect predetermined states for one or more use cases (or apparatuses) and perform predetermined operations or functions based on the detected predetermined states with respect to equipment on one or more hydraulic fracturing transports of hydraulic fracturing system 103.

AI model 630 may be a mathematical model (e.g., machine or deep learning model) for making data-driven predictions or decisions (e.g., predictions, classifications, diagnosis, and the like). Known data (e.g., sensor data) and known responses (e.g., particular image known to be corresponding to a particular predetermined state) may be used to create AI model 630 for a particular use case (or for corresponding apparatuses). AI model 630 may then be deployed on control center 605, and new data (e.g., live or real-time data from sensors 205 (e.g., image sensors, thermal imaging sensors, and the like) showing plungers 350 of fluid end assembly 216 in operation) may be fed into AI model 630, which may then produce responses (e.g., predictions, classifications, diagnosis) to the new input data, so as to detect one of plural predetermined states AI model 630 is designed to detect for a particular use case.

For example, in the fluid end packing failure use case, AI model 630 may be trained to detect any of plural predetermined states including, a 'normal' operation state in which AI model 630 detects that a particular fluid end assembly 216 is operating normally during the hydraulic fracturing operation, a 'notify' operation state in which AI model 630 detects that components of the particular fluid end assembly 216 are emanating smoke and are overheated, and a 'auto-shutdown' operation state in which AI model 630 detects that the particular fluid end assembly 216 is leaking high-pressure fracturing fluid during the hydraulic fracturing operation.

For example, the sensor 205 as an imaging sensor can detect visual characteristics of the operation of plunger 350 and stuffing box 320 as plunger 350 repeatedly reciprocates during normal operation, as noted previously. Leaking of high-pressure fracturing fluid from gland 325, smoking due to wear of stuffing box 320, and the like would produce visual indicia of the issue. The AI model 630 determines the state of fluid end assembly 216 based on this visual indicia and outputs the appropriate notification or shut-down operation state.

For example, the sensor 205 as a thermal sensor can detect thermal characteristics of the operation of plunger 350 and stuffing box 320 as plunger 350 repeatedly reciprocates during normal operation, as noted previously. Leaking of high-pressure fracturing fluid from the gland 325, smoking due to wear of stuffing box 320, and the like would produce thermal indicia of the issue. The AI model 630 determines the state of fluid end assembly 216 based on this thermal indicia and outputs the appropriate notification or shut-down operation state.

As will be appreciated, the sensor 205 as an acoustic sensor, a vibration sensor, or other sensor disclosed herein can detect the external, environmental characteristics of the operation of plunger 350 and stuffing box 320 as plunger 350 repeatedly reciprocates during normal operation, as noted previously. Failure(s) would produce indicia of the issue, and the AI model 630 determines the state of fluid end assembly 216 based on this indicia and outputs the appropriate notification or shut-down operation state.

For each detected operation state for a particular use case, control center 605 may be configured to perform a corresponding predetermined operation or function. The predetermined operation performed by control center 605 may be predefined by a user for each predetermined state of the use case. For example, in the fluid end packing failure use case, when AI model 630 determines that fluid end assembly 216 is in the 'normal' operation state, control center 605 may be configured to notify an operator (e.g., by displaying a notification on a display device) of the 'normal' state and allow normal operations of fracturing equipment on fracturing pump transport 108. When AI model 630 detects that fluid end assembly 216 is in the 'notify' operation state, control center 605 may be configured to notify an operator of the 'notify' state and display (e.g., by displaying a notification on a display device) information indicating the 'abnormal' behavior of fluid end assembly 216 during operation. When AI model 630 detects that fluid end assembly 216 is in the 'auto-shutdown' operation state, control center 605 may be configured to automatically shut down the pump (e.g., one of pumps 202A and 202B in FIGS. 2A-2B) corresponding to fluid end assembly 216 that is detected as leaking high-pressure fluid. The above described number and characteristics of the predetermined states and corresponding predetermined operations for a given use case are for illustration only. AI model 630 may instead be trained to detect other additional or alternative predetermined states and control center 605 may be configured to perform other additional or alternative corresponding operations for the fluid end packing failure use case (or for other use cases of AI system 600).

For each use case (or corresponding apparatuses), AI system 600 may include one or more trained and deployed AI models 630. Each AI model 630 may also correspond to one or more use cases. In addition, each AI model 630 may be trained with and may utilize one or more types of sensor data (e.g., image sensor, thermal imaging sensor, laser, infrared, audio sensor, and the like) for detecting predetermined states of one or more corresponding use cases. For each use case, corresponding sensors 205 (e.g., sensors 1, 2, ... N) may be configured to provide corresponding sensor data to control center 605. AI models may thus be deployed anywhere and for any piece of equipment (e.g., component or apparatus) of hydraulic fracturing system 103 whose operation is to be monitored and automatically controlled based on corresponding predetermined states. AI models for each use case may be created at control center 605 or may be created at a back-office prior to subsequent deployment on AI system 600. AI models 630 may be machine or deep learning models that rely on automated learning over time.

Figure 7:
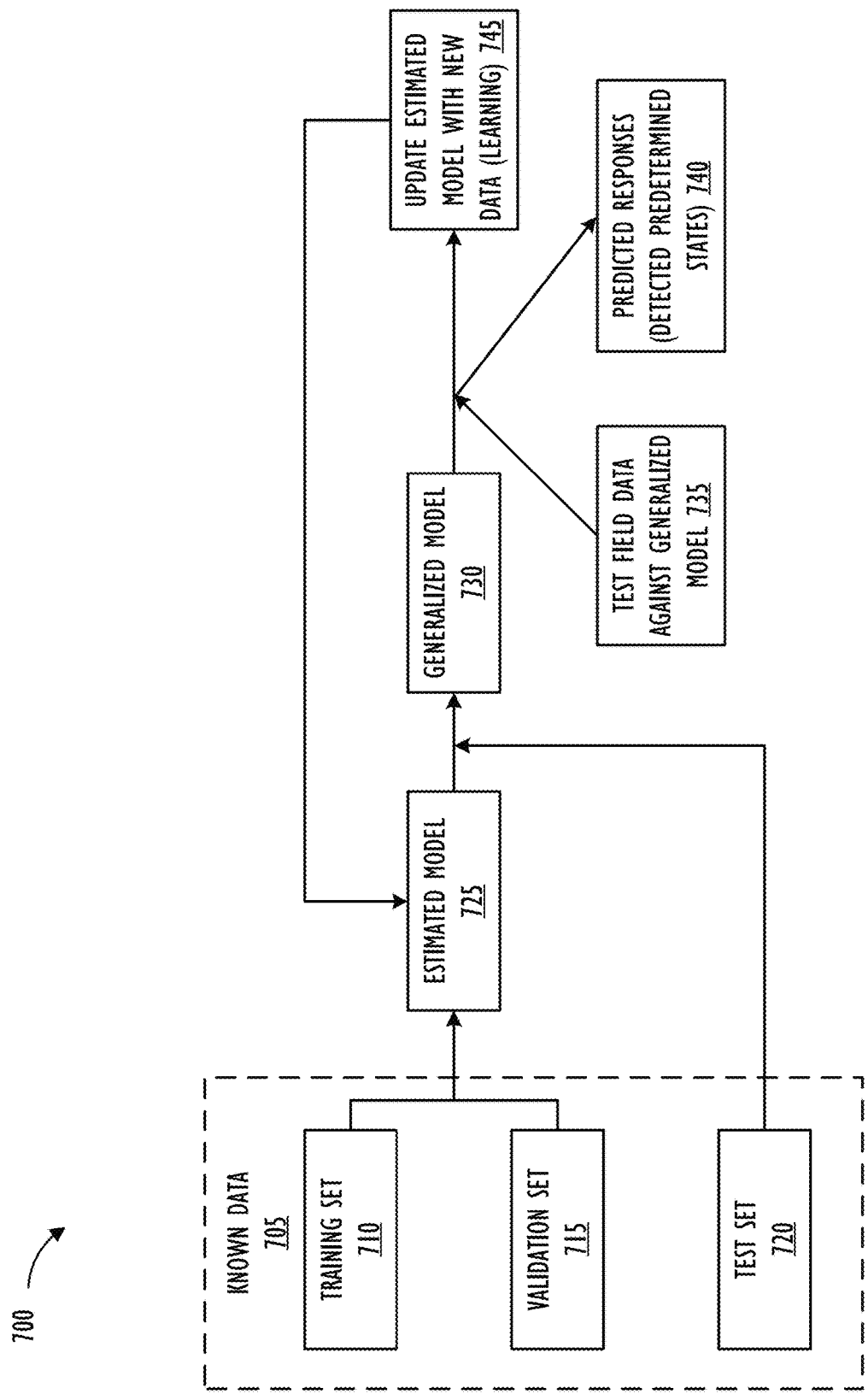
FIG. 7 is a dataflow graph illustrating an exemplary technique for creating an AI model that recognizes patterns and learns over time, in accordance with one or more embodiments.

FIG. 7 is dataflow graph 700 illustrating an exemplary technique for creating an AI model that recognizes patterns (e.g., detect predetermined states based on input image data) and learns over time, in accordance with one or more embodiments. Known data 705 is used to build an AI model (e.g., machine or deep learning model) for making data-driven decisions (e.g., predictions, classification, diagnosis). Known data 705 (e.g., known sensor data) may include known features and known responses used to train, validate and test a model that is then deployed as generalized model 730 (e.g., AI model 630) on AI system 600 to detect predetermined states for a given use case related to hydraulic fracturing system 103. For example, in the fluid end packing failure use case, known data 705 may include image data (e.g., images shown in FIGS. 4 and 5; known features) and information regarding a corresponding predetermined state (e.g., 'normal' state, 'auto-shutdown' state, 'notify' state, and the like; known responses) for each piece of known data. In another example, known data 705 can include other sensor data such as audio data, thermal imaging data, and the like, and information regarding a corresponding predetermined state each piece of known data may correspond to. Known data 705 can include multiple types or streams of sensor data. That is, an AI model may be trained based on multiple types of sensor data (e.g., audio, video, and thermal imaging data).

The technique shown in FIG. 7 may be performed for each use case of AI system 600 for which an AI model is being created and deployed. Thus, for example, the technique shown in FIG. 7 may be performed for creating and deploying an AI model for the fluid end packing failure use case based on a first set of known data 705 specific to this use case, and the technique shown in FIG. 7 may be performed again for creating and deploying another AI model for a different use case (e.g., blender or hopper use case) based on a second set of known data 705 specific to the use case.

Control center 605 (or another computer system) may subject known data 705 to pre-processing to clean and prepare the data to make it suitable for consumption by model training algorithms. An algorithm is a mathematical function that performs certain predetermined analysis on data and discovers insights from the data. The algorithm feeds an AI model which looks at characteristics of a process (e.g., use case having predetermined states) being examined and predicts how a system will behave with different variables. For example, the data (e.g., sensor 205 data) may be visualized and analyzed to run sanity checks to validate the quality of the data and to understand the data. Known data 705 may include variables and features that are attributes of examples that can be used to identify patterns to predict a target answer. Known data 705 may further include data that is labeled as a target (correct answer) associated with the attributes of the examples that the algorithm is intended to learn from and predict based on. After training, generalized model 730 is deployed and designed to predict the answer on data for which the target answer is not known. Control center 605 may further subject known data 705 to feature processing to make the features and variables of the dataset more meaningful. Feature processing may include forming more generalizable data points to learn from to provide significant improvements to the predictive, classification or diagnostic model. Common types of feature processing performed on the data may include replacing missing or invalid data, forming Cartesian products of one variable with another, non-linear transformations, creating domain-specific features, and creating variable-specific features. In one embodiment, known data 705 may include a representation of each class (e.g., predetermined state) the corresponding model is designed to predict on. In other words, in the fluid end packing failure use case, known data 705 may include images for each of the three states (e.g., 'normal' state, 'auto-shutdown' state, 'notify' state) it is being trained to predict on.

After pre-processing, control center 605 may enable (in hardware, software, or both) splitting known data 705 into training dataset 710, validation dataset 715, and test dataset 720, in order to evaluate the model to estimate the quality of its pattern generalization for data the model has not been trained on. That is, since future data instances have unknown target values that cannot be used for checking accuracy of predictions of the model, some of the data from known data 705 for which we already know the answer of the prediction target for each row is used to evaluate the accuracy of the model (and underlying algorithm). For example, 70-80% of known data 705 may be used for training and 20-30% may be used for validation and testing. Further, control center 605 may use data in training dataset 710 to train models to see patterns and use data in test dataset 720 to evaluate predictive quality of the trained model. In one embodiment, control center 605 may further split training data into training dataset 710 and validation dataset 715.

Control center 605 may then use training dataset 710 to train different models by applying different classifiers and algorithms. Examples of machine learning and deep learning algorithms that may be used to train the model may include a naïve Bayes Classifier Algorithm, K Means Clustering Algorithm, Support Vector Machine Algorithm, Linear Regression, Logistic Regression, any kind of Neural Network, Random Forests, Decision Trees, Nearest Neighbors, or Gaussian process. That is, in order to find the most suitable classifier or algorithm for the problem to be solved by the model, control center 605 may use training dataset 710 to train multiple candidate algorithms and use validation dataset 715 to compare their performances and decide which candidate algorithm to select. Control center 605 may then create estimated model 725 based on the selected algorithm. Once estimated model 725 is created, control center 605 may use test dataset 720 to obtain performance characteristics such as accuracy, sensitivity, specificity, F-measure and the like of the selected algorithm to create generalized model 730. Thus, validation dataset 715 may function as a hybrid dataset that is used as training data by testing, but neither as part of the low-level training nor as part of the final testing.

Control center 605 may further tune hyperparameters or training parameters to improve predictive performance of generalized model 730. In one embodiment, the candidate algorithms may be supervised, unsupervised or reinforcement machine learning algorithms depending on the characteristics of incoming data. Further, before deploying generalized model 730 in production (e.g., on AI system 600), control center 605 may take steps to improve performance and accuracy of the model by improving model fit by determining whether the predictive model is overfitting or underfitting training dataset 710 by looking at prediction error on training dataset 710 and validation dataset 715. The model is overfitting training dataset 710 when accuracy of training dataset 710 is higher than validation dataset 715. Conversely, the model is underfitting training dataset 710 when the model performs poorly on training dataset 710. Control center 605 may indicate corrective action to achieve balanced model fit before generalized model 730 is deployed. Once generalized model 730 that performs well is deployed, the model may be used to detect predetermined states (e.g., make predictions, classifications, diagnosis) on test field dataset 735 (i.e., live or real-time incoming data from sensors 205 during hydraulic fracturing operation) to generate predicted responses 740 (i.e., perform a prediction operation, diagnostic operation or classification operation on field data to detect one of a plurality of predetermined states for the incoming data). In one embodiment, control center 605 may make batch predictions using generalized model 730 to generate a prediction (e.g., predetermined state) for a set of observations (e.g., image data corresponding to a plurality of images) all at once based on a certain percentage of the observations meeting a threshold. Alternately, control center 605 may generate predictions on a one-by-one basis in real-time for each example (e.g., image data corresponding to each incoming image) independent of the other examples based on incoming data.

In order to keep generalized model 730 predicting accurately, control center 605 may continuously monitor incoming data and indicate that the model be updated (retrained) 745 based on new incoming data if control center 605 determines that data distribution of data on which AI model 630 is making predictions has deviated significantly from data distribution of original training dataset 710. Alternately, control center 605 may simply indicate that the model be retrained 745 periodically (e.g., daily, weekly, or monthly) regardless of whether the data distribution has changed. Data distribution may change for a variety of reasons. Generalized model 730 is created based on data available at the time the model was created and deployed. When generalized model 730 was originally developed and deployed in AI system 600, control center 605 may have made several assumptions relating to AI system 600 (e.g., data pipeline processes) that may change over time and no longer hold true. For example, data distribution may change because of changing infrastructure of AI system 600, environmental changes, and new observations made (e.g., new features related to a given predetermined state of a given use case) that didn't exist at the time of model creation. As a result, data distribution of incoming data may deviate significantly from known data 705 that was used to train generalized model 730, thereby lowering accuracy and efficiency of generalized model 730 over time and requiring updating and retraining of estimated model 725 based on the new incoming data.

As explained above, control center 605 may include multiple AI models 630 that have been trained and deployed to handle multiple different use cases for automating predetermined state detection, and performance of corresponding predetermined operations or functions by control unit 640. Control center 605 may be configured so that once an AI model 630 has been trained and deployed on control center 605, an operator may be able to set predetermined operations that are to be performed when one of the predetermined states corresponding to the trained and deployed AI model 630 is detected in real-time. For example, input/output device 650 may provide an operator with a user interface to set and configure respective predetermined operations that are to be performed when each of the predetermined states of the AI model for the particular use case is detected.

Thus, in the example described above of the fluid end packing failure use case, the user interface of input/output device 650 may enable the operator to selectively configure predetermined operations for each of the predetermined states (e.g., 'normal' state, 'auto-shutdown' state, 'notify' state). Further, the user interface of input/output device 650 may also enable the operator to change or reconfigure the predetermined operations for the predetermined states selectively. For example, if the underlying AI model 630 is updated to include a new predetermined state, the user interface of input/output device 650 may also enable the operator to set corresponding one or more predetermined operations for the new defined predetermined state the underlying AI model 630 is now capable of detecting.

Thus, for example, in case of the 'notify' state, the user interface of input/output device 650 may enable the operator to configure a predetermined function in which control unit 640 may control input/output device 650 (or another display device) to display a notification to an operator indicating that the corresponding pump is overheating. In this case, the displayed notification may also include additional information like the underlying image data (e.g., an image showing an overheated and/or smoking plunger 350) based on which the 'notify' state was predicted by the AI model, information identifying the particular fluid end assembly 216, the particular pump 202A or 202B, and the particular fracturing pump transport 108 out of a plurality of fracturing pump transports 108 corresponding to the notification.

For example, as shown in FIG. 1, well site 100 may include multiple fracturing pump transports 108, each transport containing multiple pumps 202. When one of the pumps of one of the transports 108 begins to fail (e.g., as indicated by it smoking or overheating) control unit 640 may identify the particular pump based on, for example, identification information of corresponding sensor data indicating a corresponding sensor 205 positioned on the corresponding pump which is smoking, and control unit 640 may display this identifying information as part of the notification in response to detection of the 'notify' state of the pump. For example, control unit 640 may control input/output device 650 to display a map of well site 100 which shows the various transports 108 and pumps 202, and further distinctively display the identified pump 202 on the identified transport 108 for which the notification instruction is being issued. Presentation of such information may enable an operator to easily and quickly ascertain the piece of equipment in a multi-transport fracturing fleet 103 that is potentially malfunctioning and/or beginning to malfunction, and act accordingly in a timely and highly efficient manner. For example, the notification displayed on input/output device 650 may instruct an operator to physically inspect the identified piece of equipment to determine next steps, thereby preventing potential irreparable damage to the equipment (e.g., fluid end assembly 216).

As another example, in case of the 'auto-shutdown' state, the user interface of input/output device 650 may enable the operator to configure a predetermined operation in which control unit 640 may control engagement panel 220 (or control system 208) of the particular fracturing pump transport 108 whose pump 202 is detected to be in the 'auto-shutdown' state and cause the engagement panel 220 (or control system 208) of the particular transport 108 to automatically shut down the particular pump (e.g., one of pump 202A and 202B) that is detected to be leaking by the underlying AI model 630.

In this case, the control instruction from control unit 640 may specifically identify the particular pump 202 and the particular transport 108 where the pump is located based on, for example, identification information of corresponding sensor data indicating a corresponding sensor 205 positioned on the corresponding pump which is leaking high-pressure fluid, and control unit 640 may utilize this identifying information to control a corresponding engagement panel 220 to control a corresponding pump. For example, upon receiving the instruction to shutdown pump 202A from control unit 640, engagement panel 220 may trigger disengagement of pump 202A while pump 202B remains in the engaged position and continues to operate. As a result, a particular pump 202 of a particular transport 108 of fracturing system 103 can be shutdown automatically based on state detection by a corresponding deployed AI model, thereby preventing potential irreparable damage to equipment and reducing downtime and costly repairs or replacement of equipment, component, or apparatus.

While the predetermined operations have been described above on context of predetermined states of the fluid end packing failure use case, similar predetermined operations can be performed by control unit 640 to control one or more units of AI system 600 based on preconfigured operations defined by a user corresponding to respective predetermined states of one or more other use cases. Thus, control unit 640 may similarly monitor, control, and communicate with control system 603 of power generation transport 102 to control turbine 601 and/or generator 602 based on corresponding predetermined states detected by any underlying AI model 630 deployed on control center 605 and based on corresponding sensor data detected by corresponding sensors 205 in real-time during operation and including identification information identifying which equipment the sensor data corresponds to. Similarly, control unit 640 may monitor, control, and communicate with control system 660 of blender transport 110 to control blender 665 and/or hopper 670 based on corresponding predetermined states detected by any underlying AI model 630 deployed on control center 605 and based on corresponding sensor data detected by corresponding sensors 205 in real-time during operation and including identification information identifying which equipment the sensor data corresponds to. Control center 605 may similarly automatically control other equipment (e.g., chemical additive unit 610, hydration unit 615) of fracturing system 103 based on any corresponding detected predetermined states, any underlying created and deployed AI models, and any corresponding incoming sensor data from corresponding sensors 205.

In addition to the fracturing pump transport 108, the blender transport 110 of the hydraulic fracturing fleet 103 also has mechanical components that can be monitored and controlled by the disclosed AI system of the present disclosure. To that end, discussion turns to use cases for AI system 600 to monitor equipment on blender transport 110, which are illustrated below in connection with FIGS. 8A-8B, and 9A-9B.

Figure 8A:
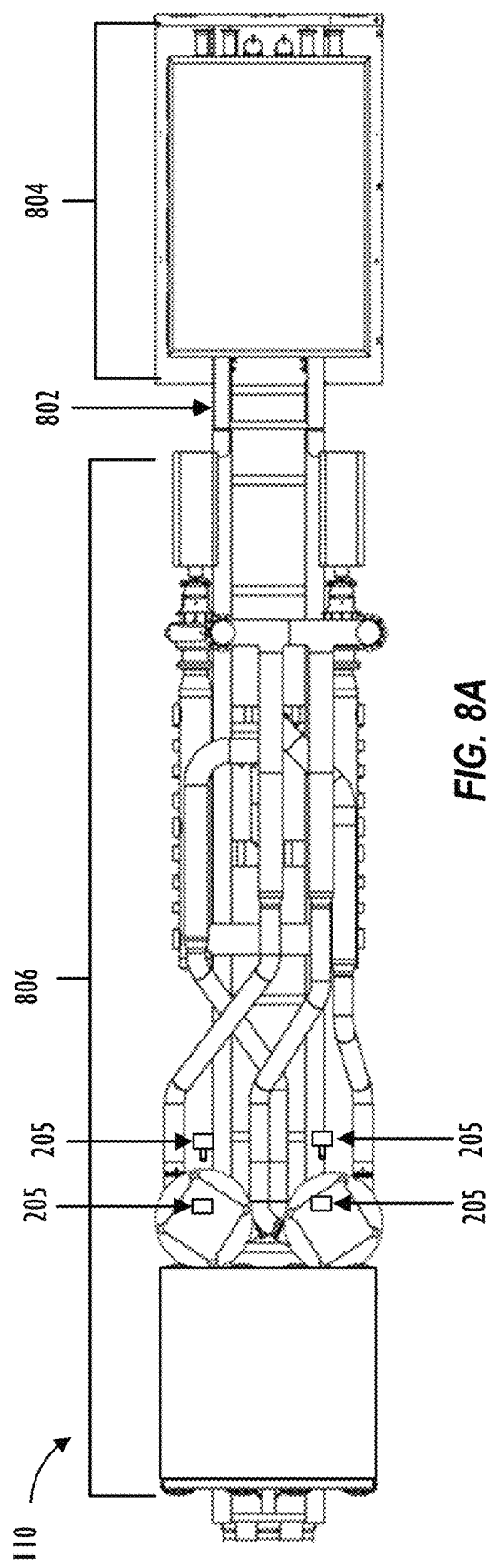
FIG. 8A is a schematic diagram of an embodiment of a blender transport that includes an electric blender.
Figure 8B:
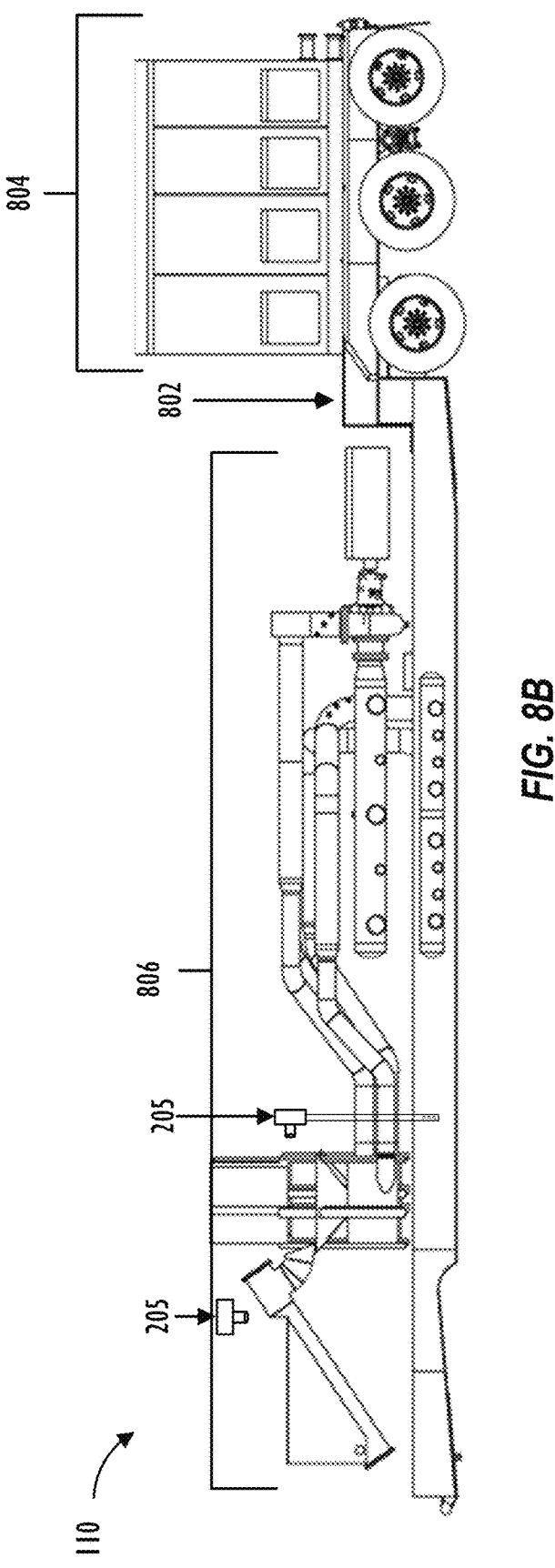
FIG. 8B is a schematic diagram of an embodiment of a blender transport that includes an electric blender.

FIGS. 8A and 8B are schematic diagrams of an embodiment of blender transport 110 that includes electric blender 806. FIG. 8A illustrates a top-down view of blender transport 110 and FIG. 8B illustrates a side-profile view of blender transport 110. Blender transport 110 may be powered by power generation transport 102 as described in FIG. 1. Electric blender 806 may be a dual configuration blender with a blending capacity of about 240 bpm. The dual configuration blender may comprise electric motors for all rotating machinery and may be mounted on a single transport. The dual configuration blender may have two separate blending units that are configured to be independent and redundant. For example, any one or both the blending units may receive a source fluid via inlet manifolds of the blending units. The source fluid may originate from the same source or different sources. The source fluid may subsequently be blended by any one or both of the blending tub and subsequently discharged out of any one or both outlet manifolds of the blending units. Other embodiments of blender transport 110 may be a single configuration blender that includes a single blending unit.

FIGS. 8A and 8B illustrate a "lay-down" trailer 802 design that provides mobility and improves ergonomics for the crew members that perform routine maintenance and operations of electric blender 806 as the "lay-down" design positions the blender tubs, pumps and piping lower to the ground level and the main trailer beams are resting on the ground for operational mode. Similar to "lay-down" trailer 210, "lay-down" trailer 802 may comprise an upper section above the trailer axles and a lower section below the trailer axles. In one embodiment, electric blender 806 and associated equipment on the trailer may be controlled and monitored remotely via AI system 600. As shown in FIGS. 8A and 8B, blender control system 804 that comprises a PLC, transformers and one or more variable frequency drives are mounted on upper section of blender transport 110. To provide remote control and monitoring functions, control center 605 of AI system 600 may interface and communicate with the PLC (e.g., provide operating instructions), and the PLC may subsequently control one or more variable frequency drives mounted on blender trailer 110 to drive one or more electric motors of the blender.

Operating blender transport 110 remotely may eliminate equipment operators from being exposed to hazardous environment and avoiding potential exposure to concentrated chemicals, silica dust, and rotating machinery. For example, a conventional blender transport typically includes a station for an operator to manually operate the blender. By remotely controlling using the control network and blender control system 804, the station may be removed from the blender transport 110. Recall that a data van may act as a hub to provide the remote control and monitoring functions and instructions to blender control system 804.

Figure 9A:
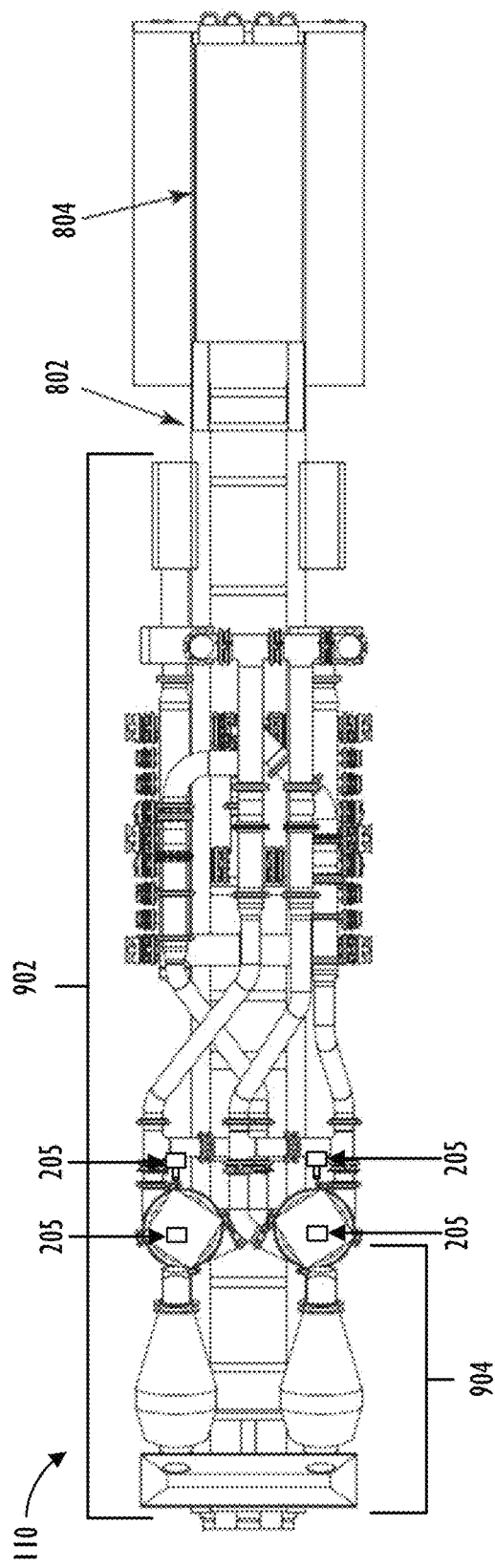
FIG. 9A is a schematic diagram of an embodiment of a blender transport that includes an electric blender with enclosed mixer hoppers.
Figure 9B:
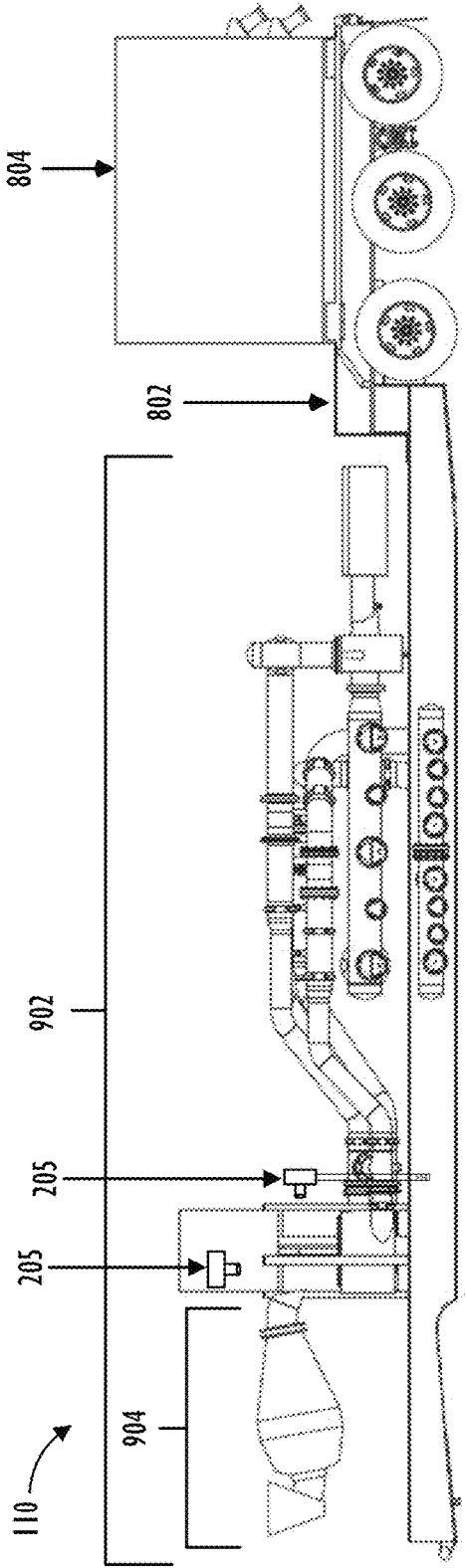
FIG. 9B is a schematic diagram of an embodiment of a blender transport that includes an electric blender with enclosed mixer hoppers.

FIGS. 9A and 9B are schematic diagrams of an embodiment of blender transport 110 that includes electric blender 902 with enclosed mixer hoppers 904. FIG. 9A illustrates a top-down view of blender transport 110 and FIG. 9B illustrates a side-profile view of blender transport 110. Electric blender 902 is substantially similar to electric blender 806 except that electric blender 902 uses enclosed mixer hoppers 904 to add proppants and additives to the blending tub.

FIGS. 9A and 9B illustrate that electric blender 902 is a dual configuration blender that includes two enclosed mixer hoppers 904 powered by two electric motors, where each of the electric motors may operate an enclosed mixer hopper 904. Blenders that comprises open hoppers and augers typically have the proppants (e.g., sand) and/or additives exposed to the weather elements. In situations where precipitation occurs at the well site, operators may cover the open hoppers and augers with drapes, tarps, and/or other coverings to prevent the precipitation from contaminating the proppants and/or additives. Enclosed mixer hopper 904 replaces the open hopper and augers typically included in a blender (e.g., electric blender 806 in FIGS. 8A and 8B) with enclosed mixer hoppers 904 (FIGS. 9A and 9B). By replacing the open hopper and augers with enclosed mixer hoppers 904 blender transport 110 may have the advantages of dust free volumetric proppant measurement, dust free mixing of proppant and additives, moderate the transport of proppants, perform accurate volumetric measurements, increase proppant transport efficiency with low slip, prevent proppant packing from vibration, produce a consistent volume independent of angle of repose, and meter and blend wet sand. Other advantages include the removal of gearboxes and increasing safety for operators with the enclosed drum.

As shown in FIGS. 8A-8B and 9A-9B, blender transport 110 may also include one or more sensors 205. Again, sensor 205 can be exposed to an external environment of at least one mechanical component of the blender transport 110, such as blender, hopper, auger, or the like. Sensor 205 is configured to detect at least one external indicia of the operation of the at least one mechanical component. In general, sensor 205 can be an imaging sensor detecting visual characteristics, a thermal sensor detecting thermal characteristics, an acoustic sensor detecting sound, and a motion sensor detecting motion related to the operation of the at least one mechanical component. Proper operation of the mechanical component would be indicated by a consistent pattern of imaging, thermal, acoustic, and motion detections. A change in this consistent pattern would thereby equate to a potential issue with the operation of the mechanical component, such as indications of a failure, a leak, or the like.

In the example embodiment shown in FIGS. 8A-8B and 9A-9B, four sensors 205 are illustrated as being positioned on each blender transport 110. However, this may not necessarily be the case. The number, type, position, angle, and other characteristics of sensors 205 are not intended to be limiting to that shown in the drawings, and may be determined based on the use case (e.g., what equipment, component, or apparatus of the blender transport is being monitored), and the types of predetermined states (e.g., what are the relevant operational states of the monitored equipment) that are being monitored by sensors 205.

As one non-limiting example, sensors 205 may be imaging sensors that are positioned to face blender 806 in FIGS. 8A-8B (or hoppers 904 in FIGS. 9A-9B) to detect sand (or other additive) flow rates and to detect whether sand is overflowing out of blender 806 or hopper 904. When an overflow or failure begins, the consistent nature of the imaging will change as the imaging sensor 205 detects sand visibly overflowing out of blender 806 or hopper 904, fracing fluid overflowing out of blender 806, smoke emanating from blender 806, hopper 904 or from equipment surrounding these components, and the like.

For example, as shown in FIGS. 8A-8B and 9A-9B, one or more sensors 205 (e.g., cameras) may be positioned on blender transport 110 to provide a video feed of blenders 806, hoppers 904, or blending tubs. This sensor data (e.g., image data, laser signal measurement data, flow sensor data, IR data, and the like) may be output to control center 605 that may be configured with an underlying AI model 630 that is created and deployed for this blender transport 110 use case, and that may be able to detect predetermined states corresponding to the equipment being monitored on blender transport 110, and perform corresponding predetermined operations or functions based on the detected state. As explained previously, the predetermined operations corresponding to the detectable predetermined states of AI model 630 corresponding to the blender transport 110 use case may similarly be preconfigured (and be reconfigurable) by the operator. Control center 605 may thus configure control system 660 of blender transport 110 to perform predetermined operations (e.g., notify operator, change sand flow rate, shut down blender transport 110) based on the predetermined state detected by AI model 630 based on sensor 205 data input to the model for the blender transport use case.

In previous discussions, the AI system of the present disclosure has been described as monitoring and controlling mechanical components on the fracturing pump transport 108 and the blender transport 110. As will be appreciated with the benefit of the present disclosure, other mechanical or electrical components of the hydraulic fracturing fleet 103 can also benefit from monitoring and control provided by the AI system of the present disclosure. For example, AI system may be configured to compare a calculated horsepower output of a component or transport (e.g., frac pump transport 108) of fleet 103 with a measured power consumed, and perform predetermined operations (e.g., notify operator) when the AI system detects inefficiency based on any deviation in the comparison being beyond a predetermined limit. As another example, the AI system may be configured to alert an operator (i.e., predetermined operation or function) when a user is detected (e.g., using one or more sensors 205, and a corresponding trailed AI model 630) to be within a predetermined radius of predetermined equipment (e.g., fluid end 216, blender 665, hopper 670, and the like) that is determined to be in a predetermined state (e.g., overheating state, smoking state, fluid end packing failure (leaking) state, overflow state, and the like).

Figure 10:
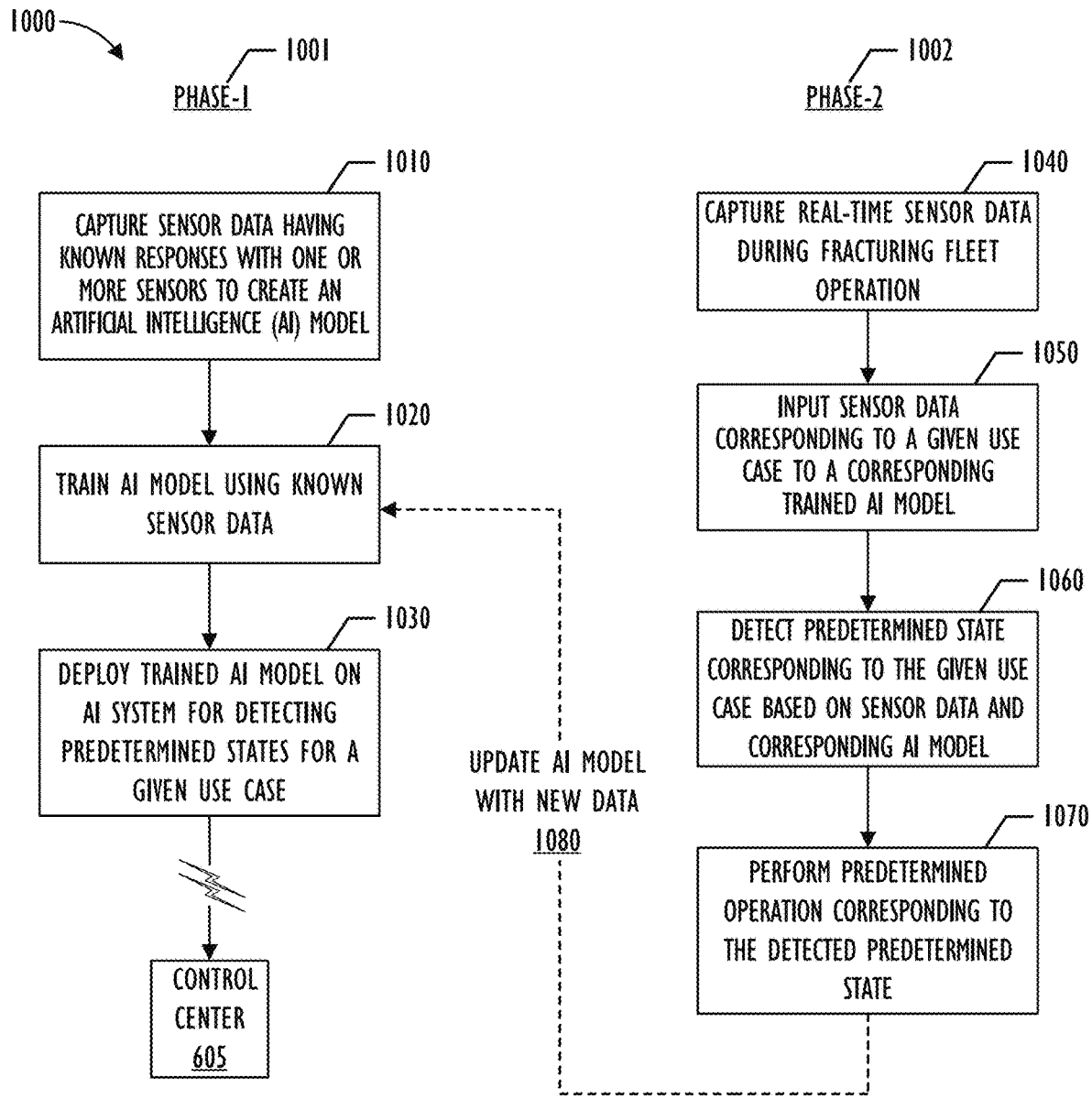
FIG. 10 is a flowchart illustrating a technique for creating and implementing the AI model in accordance with one or more embodiments.

FIG. 10 is a flowchart illustrating method 1000 for creating and implementing the AI model in accordance with one or more embodiments. Method 1000 may be performed for each AI model created and deployed for each use case (or corresponding apparatuses) on AI system 600. As illustrated in FIG. 10, method 1000 may include two phases. In phase-1 1001, control center 605 (or another computer system) may control one or more sensors 205 to capture sensor data offline or a priori having known responses (block 1010). Alternately, sensor data captured at block 1010 may be historical data from past hydraulic fracturing operations that have been analyzed to identify corresponding known responses (e.g., analyze historical images to identify corresponding known predetermined states). For example, in the fluid end packing failure use case, the captured sensor data at block 1010 may be image data from one or more image sensors 205 placed at one or more fluid end assemblies 216 of one or more fracturing pump transports. Sensor data at block 1010 may include known data for each of a plurality of predetermined states in which the corresponding AI model being trained can classify future test data into.

At block 1020, control center 605 may use data captured at block 1010 to train an AI model. As explained in connection with FIG. 7, AI model may be any artificial intelligence model (e.g., machine learning or deep learning model) that can detect predetermined states (e.g., perform prediction, classification, or diagnostic operation) for input test field data. At block 1030, control center 605 may deploy trained AI model (e.g., AI model 630) on AI system 600 for automatically monitoring and controlling equipment (e.g., components or apparatuses corresponding to the AI model) on one or more transports of fracturing system 103 for the use case for which AI model has been trained to detect the predetermined states.

In phase-2 1002, one or more sensors 205 corresponding to the use case of the AI model deployed at block 1030 may capture sensor data continuously and in real-time during hydraulic fracturing operations (block 1040). For example, sensor data may be image data that is captured by one or more image sensors 205 in real-time at a predetermined number of frames per second so as to capture a live video feed of a plurality of apparatuses (e.g., plurality of fluid end assemblies 216 on plurality of frac pump transports 108). As another example, sensor data can be audio data (that can be analyzed by a corresponding AI model), thermal imaging data (that can be analyzed by a corresponding AI model), and the like.

At block 1050, sensor data captured at block 1040 may be input to the trained and deployed AI model 630 on control center 605 for the AI model to perform the state detection operation for each apparatus of the use case based on corresponding input sensor data. At block 1060, the AI model may detect one of a plurality of predetermined states as a predetermined state corresponding to the sensor data input at block 1050 and output information regarding the detected predetermined state to control unit 640. Thus, at block 1060, the AI model may detect the current predetermined state of each of the plurality of apparatuses that are being monitored and controlled for the corresponding use case and output the detected state for each apparatus based on corresponding received sensor data. For example, the AI model may detect the state of Pump A on Trailer 1 based on Pump A sensor data and detect the state of Pump B on Trailer 2 based on Pump B sensor data. At block 1070, control unit 640 may perform one or more predetermined operations corresponding to the predetermined state detected at block 1060. For example, control unit 640 may perform a first operation (e.g., notify operator) for Pump A on Trailer 1 based on the detected state thereof, and perform a second operation (e.g., automatically shut down pump) for Pump B on Trailer 2 based on the detected state thereof. As another example, control unit 640 may further perform a third operation (e.g., issue an alert) for Pump B on Trailer 2 based on detection of a user within a predetermined radius ("danger zone") of Pump B while Pump B is in the detected state (e.g., overheating state, high-pressure fluid leak state, and the like). Steps performed at blocks 1040-1070 may be repeatedly performed based on sensor data captured continuously and in real-time at block 1040 for each of a plurality of components (or equipment) corresponding to the use case associated with the deployed AI model. In addition, as explained in connection with FIG. 7, control unit 640 may also update AI model 630 deployed at block 1030 based on new sensor data captured at block 1040 (block 1080).

Figure 11:
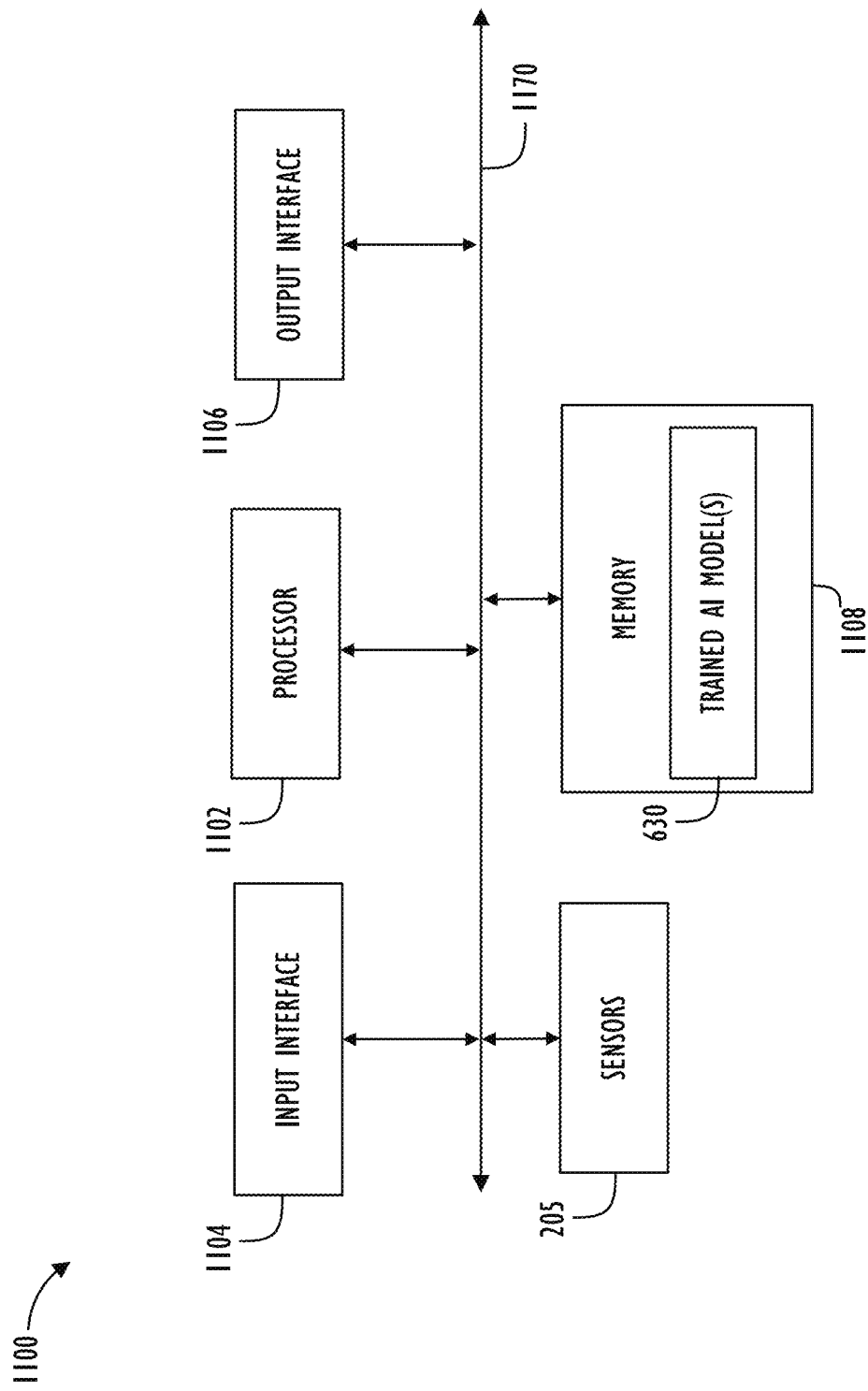
FIG. 11 shows an illustrative simplified block diagram of a computing system that includes the AI model in accordance with one or more embodiments.

FIG. 11 shows an illustrative simplified block diagram of computing system 1100 that includes one or more trained and deployed AI models 630 in accordance with one or more embodiments. Computing system 1100 may correspond to or may be part of a computer and/or any other computing device, such as a workstation, server, mainframe, super computer, and/or portable computing device. With reference to FIGS. 1, 2A-2B, 6, 7, 8A-8B, 9A-9B, computing system 1100 may correspond to a computer implemented in data van 114, control system 208, control center 605, control system 603, control system 660, and/or control system 804. Computing system 1100 comprises a processor 1102, which may be also be referenced as a central processor unit (CPU). Processor 1102 (e.g., programmable control device) may communicate (e.g., via a system bus 1170) and/or provide instructions to other components within the computing system 1100, such as the input interface 1104, output interface 1106, and/or memory 1108. In one embodiment, processor 1102 may comprise one or more multi-core processors and/or memory mediums (e.g., cache memory) that function as buffers and/or storage for data. Additionally, processor 1102 may be part of one or more other processing components, such as application specific integrated circuits (ASICs), field-programmable gate arrays (FPGAs), and/or digital signal processors (DSPs). Although FIG. 11 illustrates that processor 1102 may be a single processor, processor 1102 is not so limited and instead may represent multiple processors. The processor 1102 may be configured to implement any of the operations described herein, including operations 700 and 1000 as described in FIGS. 7 and 10, and operations performed by AI system 600 described in FIG. 6.

FIG. 11 illustrates that memory 1108 may be operatively coupled to processor 1102. Memory 1108 may be a non-transitory medium or non-transitory program storage device configured to store various types of data. For example, memory 1108 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 11, memory 1108 may be used to house the instructions and models for carrying out various embodiments described herein. In an embodiment, memory 1108 may comprise one or more trained and deployed AI models 630 and instructions for implementing operations 700 and 1000 as described in FIGS. 7 and 10, and operations performed by AI system 600 described in FIG. 6. Instructions and data in memory 1108 may be accessed and implemented by processor 1102. Additionally, or alternatively, AI models 630, instructions for implementing operations 700 and 1000 as described in FIGS. 7 and 10, and operations performed by AI system 600 described in FIG. 6 may be stored and accessed within memory embedded in processor 1102 (e.g., cache memory). In one embodiment, memory 1108 may interface with system bus 1170 (e.g., a computer bus) to communicate and/or transmit information stored in memory 1108 to processor 1102 during execution of software programs, such as software applications that comprise program code, and/or computer executable process steps that incorporate functionality described herein.

Persons of ordinary skill in the art are aware that software programs may be developed, encoded, and compiled in a variety of computing languages for a variety of software platforms and/or operating systems and subsequently loaded and executed by processor 1102. In one embodiment, the compiling process of the software program, may transform program code written in a programming language to another computer language such that the processor 1102 is able to execute the programming code. For example, the compiling process of the software program may generate an executable program that provides encoded instructions (e.g., machine code instructions) for processor 1102 to accomplish specific, non-generic, particular computing functions, such as detecting predetermined states of a particular use case based on a corresponding trained AI model, and performing predetermined operations or functions based on the detected predetermined state.

After the compiling process, one or more of AI models 630, instructions for implementing operations 700 and 1000 as described in FIGS. 7 and 10, and operations performed by AI system 600 described in FIG. 6 may be loaded as computer executable instructions or process steps or data to processor 1102 from storage (e.g., memory 1108, storage medium/media, removable media drive, and/or other storage device) and/or embedded within the processor 1102. Processor 1102 can execute the stored instructions or process steps or data to perform instructions or process steps to transform computing system 1100 into a non-generic, particular, specially programmed machine or apparatus. Stored data, e.g., data stored by a storage device, sensor data, and the like can be accessed by processor 1102 during the execution of computer executable instructions or process steps to instruct one or more components within computing system 1100.

Alternatively, rather than programming and/or loading executable instructions onto memory 1108 and/or processor 1102 to form a non-generic, particular machine or apparatus, persons of ordinary skill in the art are aware that stored instructions may be converted and implemented as hardware customized for a particular use. In one embodiment, implementing instructions, such as detecting predetermined states of a particular use case based on a corresponding trained AI model and input sensor data, and performing predetermined operations based on the detected predetermined state, by loading executable software into a computing device, can be converted to a hardware implementation by well-known design rules. For example, the compiling process of the software program may build a sequence of instruction bits that control and arrange a sequence of control gate-level components that write data onto buses, into latches and registers, across channels, memory, and/or other components of processor 1102 and/or memory 1108. The compiling of one or more of AI models 630, instructions for implementing operations 700 and 1000 as described in FIGS. 7 and 10, and operations performed by AI system 600 described in FIG. 6 may produce gate-level components with fixed relationships designed to accomplish specific, non-generic, particular computing functions.

The decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or other application specific hardware that hardwires the instructions or process steps of the software. In the same manner as a machine controlled by a new ASIC is a non-generic, particular, specially programmed machine or apparatus, likewise a computing device (e.g., a computer) that has been programmed and/or loaded with executable instructions or process steps should be viewed as a non-generic, particular, specially programmed machine or apparatus.

FIG. 11 also illustrates that processor 1102 may be operatively coupled to input interface 1104 configured to receive input sensor data and/or direct-report data, and output interface 1106 configured to output and/or display an avatar model and/or perceptual data. The input interface 1104 may be configured to obtain input sensor data and/or direct-report data and/or other information via cables, connectors, wireless connections and/or other communication protocols. In one embodiment, the input interface 1104 may be a network interface that comprises multiple ports configured to receive and/or transmit data via a network. In particular, the network interface may transmit the data via wired links, wireless link, and/or logical links. Other examples of input interface 1104 may be universal serial bus (USB) interfaces, CD-ROMs, DVD-ROMs and/or connections to one or more sensors. Output interface 1106 may include to one or more connections for a graphic display (e.g., monitors), a printing device that produces hard-copies of the generated results, and/or a plurality of ports that transmit data via cables, connectors, wireless connections, and/or other communication protocols. FIG. 11 also illustrates that processor 1102 may be operatively coupled to one or more sensors 205 to generate the sensor data corresponding to fracturing system 103. Persons of ordinary skill in the art are aware that computing system 1100 may comprise other components well known in the art, such as other sensors, powers sources, and/or analog-to-digital converters, not explicitly shown in FIG. 11.

Figure 12:
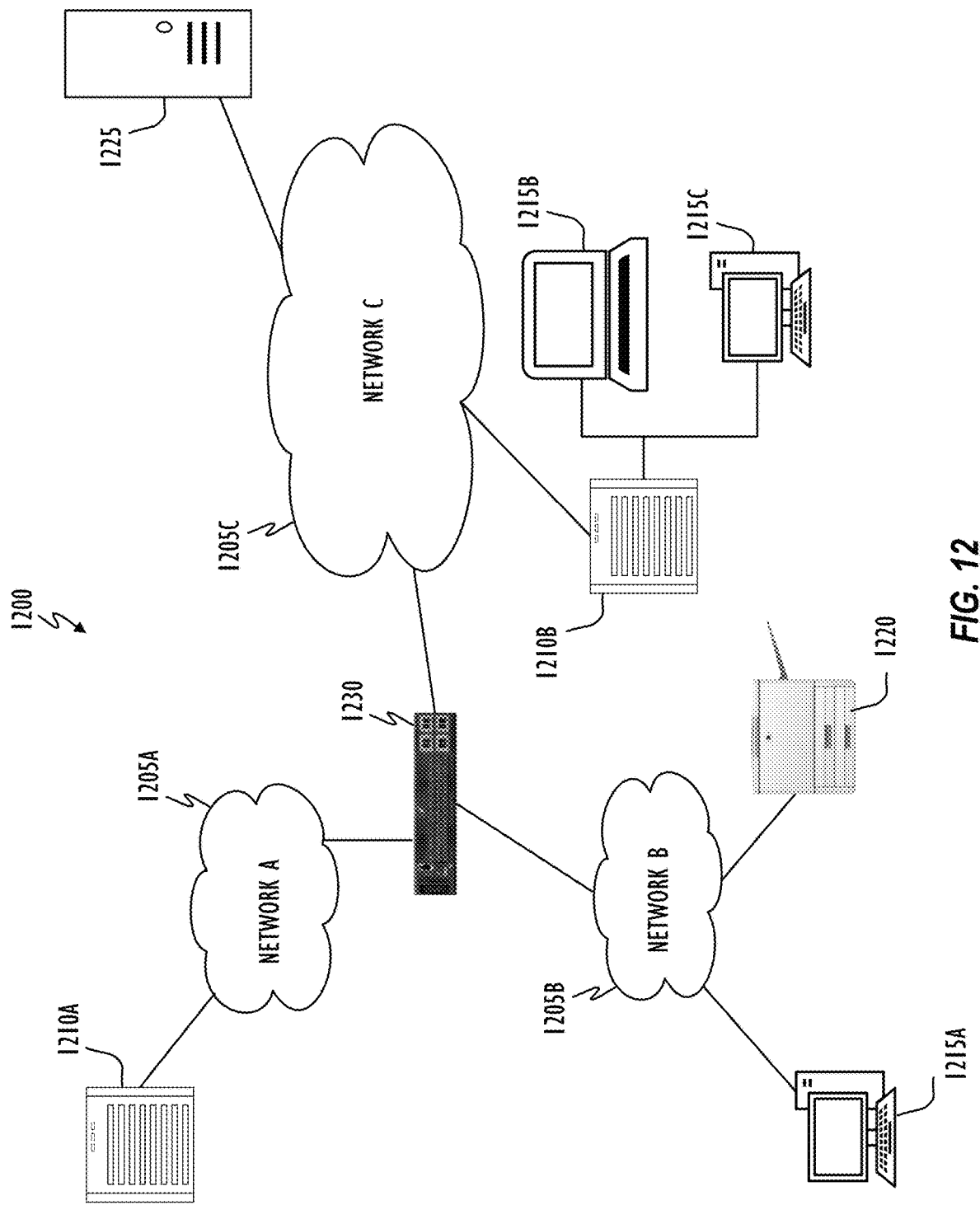
FIG. 12 shows an illustrative block diagram of a computer network in accordance with one or more embodiments.

Referring to FIG. 12, illustrative network architecture 1200 in which AI system 600 may be implemented includes a plurality of networks 1205, (e.g., 1205A, 1205B and 1205C), each of which may take any form including, but not limited to, a local area network (LAN) or a wide area network (WAN) such as the Internet. Further, networks 1205 may use any desired technology (wired, wireless or a combination thereof) and communication protocol (e.g., TCP, or transmission control protocol and PPP, or point to point). Coupled to networks 1205 are data server computer systems 1210 (e.g., 1210A and 1210B) that are capable of communicating over networks 1205. Also coupled to networks 1205, and/or data server computer systems 1210, are client or end-user computer systems 1215 (e.g., 1215A, 1215B and 1215C). Each of these elements or components may be a computer system or electronic device as described above with respect to FIGS. 1-11. In some embodiments, network architecture 1200 may also include network printers such as printer 1220 and network storage systems such as 1225. To facilitate communication between different network devices (e.g., server computer systems 1210, client computer systems 1215, network printer 1220 and storage system 1225), at least one gateway or router 1230 may be optionally coupled there between.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A system for monitoring operation of at least one component in a hydraulic fracturing fleet, the system comprising:
    at least one sensor exposed to an external environment of the at least one component and configured to detect at least one external indicia of the operation of the at least one component;
    memory storing an artificial intelligence (AI) model that is trained using data of historical external indicia of historical monitored operations of components in historical hydraulic fracturing fleets and labeled historical predetermined states corresponding to the historical external indicia; and one or more processors operatively coupled to the at least one sensor and the memory, the one or more processors being configured to:
obtain data of the at least one external indicia detected with the at least one sensor;
input the obtained data into the AI model;
detect, with the AI model based on the input data of the at least one external indicia, one of a plurality of predetermined states corresponding to the operation of the at least one component; and
perform a predetermined function based on the detected one of the plurality of predetermined states.

2. The system according to claim 1, wherein the data of the at least one external indicia detected with the at least one sensor comprises at least one of: image data, thermal imaging data, audio data, video data, and infrared sensor data.

3. The system according to claim 1, wherein the data of the historical external indicia includes, for each of the plurality of predetermined states, known data of the at least one external indicia of the at least one component; and wherein the one or more processors are further configured to:
deploy the trained AI model on the system for the hydraulic fracturing fleet.

4. The system according to claim 1, wherein the at least one component corresponds to at least one plunger of at least one pump on at least one fracturing pump transport of the hydraulic fracturing fleet, and wherein the one or more processors are further configured to:
obtain image data of the at least one plunger as the data of the at least one external indicia of the at least one component during a hydraulic fracturing operation;
input the image data into the AI model;
detect with the AI model one of the plurality of predetermined states for the at least one plunger based on the input image data;
perform a first of the predetermined function in response to the AI model detecting a first one of the plurality of predetermined states for the at least one plunger; and
perform a second of the predetermined function in response to the AI model detecting a second one of the plurality of predetermined states for the plunger.

5. The system according to claim 4, wherein the plurality of predetermined states for the at least one plunger based on the input image data of the at least one external indicia comprises one or more of: a leak associated with at least one seal of the at least one plunger, a smoke associated with the at least one seal of the at least one plunger, and a wear associated with a surface of the at least one plunger.

6. The system according to claim 4, wherein:
to perform the first predetermined function, the one or more processors are configured to disengage the at least one pump including the at least one plunger from a corresponding prime mover on the at least one fracturing pump transport; and
to perform the second predetermined function, the one or more processors are configured to present a notification indicating the detected second predetermined state of the at least one plunger of the at least one pump.

7. The system according to claim 6, wherein to present the notification indicating the second detected predetermined state, the one or more processors are configured to display, on a display device, a message identifying the at least one pump including the at least one plunger and the second detected predetermined state of the plunger.

8. The system according to claim 1, wherein the at least one component corresponds to a blender or a hopper on a blender transport of the hydraulic fracturing fleet, and wherein one or more processors are further configured to:
obtain image data of the blender or the hopper as the data of the at least one external indicia of the at least one component during a hydraulic fracturing operation;
input the image data into the AI model;
detect with the AI model one of the plurality of predetermined states for the blender or the hopper based on the input image data;
perform a first of the predetermined function in response to the AI model detecting a first one of the plurality of predetermined states for the blender or the hopper; and
perform a second of the predetermined function in response to the AI model detecting a second one of the plurality of predetermined states for the blender or the hopper.

9. The system according to claim 8, wherein the plurality of predetermined states for the blender or hopper based on the input image data of the at least one external indicia comprises one or more of: a flow rate of proppant or additive into the blender or from the hopper, an overflow of the proppant or additive from the blender or hopper, and a dust produced from the proppant or additive in the blender or hopper.

10. The system according to claim 8, wherein:
to perform the first predetermined function, the one or more processors are configured to shut down the blender or the hopper on the blender transport; and
to perform the second predetermined function, the one or more processors are configured to present a notification identifying the blender or the hopper and the detected second predetermined state thereof.

11. A method, comprising:
obtaining data of at least one external indicia of operation of at least one component in a hydraulic fracturing fleet, wherein the data is detected with at least one sensor;
inputting the obtained data into an AI model, the AI model being trained using data of historical external indica of historical monitored operations of components in historical hydraulic fracturing fleets and labeled historical predetermined states corresponding to the historical external indica;
detecting, with the AI model and based on the input data of the at least one external indicia, one of a plurality of predetermined states corresponding to the operation of the at least one component; and
performing a predetermined function based on the detected one of the plurality of predetermined states.

12. The method according to claim 11, wherein the data of the at least one external indicia detected with the at least one sensor includes at least one of image data, thermal imaging data, audio data, video data, and infrared sensor data.

13. The method according to claim 11, wherein the data of the historical external indicia includes, for each of the plurality of predetermined states, known data of the at least one external indicia of the at least one component; and wherein the method further comprises:
deploying the trained AI model on a system implemented for the hydraulic fracturing fleet.

14. The method according to claim 11, wherein the at least one component corresponds to a plunger of a pump on a fracturing pump transport of the hydraulic fracturing fleet, and wherein the method further comprises:
obtaining image data of the plunger as the data of the at least one external indicia of the at least one component during a hydraulic fracturing operation;

inputting the image data into the AI model;
detecting with the AI model one of the plurality of predetermined states for the plunger based on the input image data;
performing a first predetermined function in response to the AI model detecting a first one of the plurality of predetermined states for the plunger; and
performing a second predetermined function in response to the AI model detecting a second one of the plurality of predetermined states for the plunger.

15. The method according to claim 14, wherein the plurality of predetermined states for the at least one plunger based on the input image data of the at least one external indicia comprises one or more of: a leak associated with at least one seal of the at least one plunger, a smoke associated with the at least one seal of the at least one plunger, and a wear associated with a surface of the at least one plunger.

16. The method according to claim 14, wherein:
the first predetermined function comprises disengaging the pump including the plunger from a corresponding prime mover; and
the second predetermined function comprises presenting a notification indicating the detected predetermined state of the plunger of the pump.

17. The method according to claim 16, wherein presenting the notification indicating the detected predetermined state comprises displaying on a display device, a message identifying the pump including the plunger and the detected predetermined state of the plunger.

18. The method according to claim 11, wherein the at least one component corresponds to a blender or a hopper on a blender transport of the hydraulic fracturing fleet, and wherein the method further comprises:
obtaining image data of the blender or the hopper as the data of the at least one external indicia of the at least one component during a hydraulic fracturing operation;
inputting the image data into the AI model;
detecting with the AI model one of the plurality of predetermined states for the blender or the hopper based on the input image data;
performing a first predetermined function in response to the AI model detecting a first one of the plurality of predetermined states for the blender or the hopper; and
performing a second predetermined function in response to the AI model detecting a second one of the plurality of predetermined states for the blender or the hopper.

19. The method according to claim 18, wherein:
the first predetermined function comprises shutting down the blender or the hopper; and
the second predetermined function comprises presenting a notification identifying the blender or the hopper and the detected predetermined state thereof.

20. A non-transitory program storage device, readable by one or more programmable control devices and comprising instructions stored thereon to cause the one or more programmable control devices to perform a method according to any one of claims 11 to 19.

* * * * *

UNITED STATES PATENT AND TRADEMARK OFFICE
CERTIFICATE OF CORRECTION

PATENT NO. : 11,927,087 B2
APPLICATION NO. : 16/938759
DATED : March 12, 2024
INVENTOR(S) : Bodishbaugh et al.

Page 1 of 1

It is certified that error appears in the above-identified patent and that said Letters Patent is hereby corrected as shown below:

In the Claims

In Column 32, in Claim 1, Line 63, delete "indica" and insert -- indicia --, therefor.

In Column 32, in Claim 1, Line 67, delete "indica;" and insert -- indicia; --, therefor.

In Column 34, in Claim 11, Line 38, delete "indica" and insert -- indicia --, therefor.

In Column 34, in Claim 11, Line 42, delete "indica;" and insert -- indicia; --, therefor.

Signed and Sealed this
Tenth Day of June, 2025

Coke Morgan Stewart
*Acting Director of the United States Patent and Trademark Office*